(12) United States Patent
Schultz et al.

(10) Patent No.: US 10,084,754 B2
(45) Date of Patent: Sep. 25, 2018

(54) VIRTUAL PRIVATE NETWORK AGGREGATION

(71) Applicant: Microsoft Technology Licensing, LLC, Redmond, WA (US)

(72) Inventors: Benjamin M. Schultz, Bellevue, WA (US); Aman Arneja, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 14/966,794

(22) Filed: Dec. 11, 2015

(65) Prior Publication Data

US 2017/0171156 A1    Jun. 15, 2017

(51) Int. Cl.
*H04L 9/00* (2006.01)
*H04L 29/06* (2006.01)
*H04L 9/06* (2006.01)
*H04L 9/14* (2006.01)
(Continued)

(52) U.S. Cl.
CPC ............ *H04L 63/0272* (2013.01); *H04L 9/00* (2013.01); *H04L 9/06* (2013.01); *H04L 9/14* (2013.01); *H04L 9/30* (2013.01); *H04L 63/029* (2013.01); *H04L 63/04* (2013.01); *H04L 63/0414* (2013.01); *H04L 63/0428* (2013.01); *H04L 63/0435* (2013.01); *H04L 63/0442* (2013.01); *H04L 63/0478* (2013.01);
(Continued)

(58) Field of Classification Search
CPC .................................................. H04L 63/0272
See application file for complete search history.

(56) References Cited

U.S. PATENT DOCUMENTS

| 7,590,123 B2 | 9/2009 | Asati et al. |
| 7,590,736 B2 | 9/2009 | Hydrie et al. |
| 7,660,241 B2 | 2/2010 | Sridhar et al. |

(Continued)

FOREIGN PATENT DOCUMENTS

JP    2012165199 A    8/2012
WO   WO 2016020727 A1 *  2/2016  ......... H04L 12/4633

OTHER PUBLICATIONS

Ali, et al., "A Distributed Bandwidth-Guaranteed Routing Algorithm for Point-To-Multipoint VPLS Virtual Connections", In Proceedings of IEEE International Conference on Communications, vol. 3, May 16, 2005, 5 page.

(Continued)

*Primary Examiner* — Alexander Lagor
*Assistant Examiner* — Syed M Ahsan
(74) *Attorney, Agent, or Firm* — Workman Nydegger

(57) ABSTRACT

Aggregating traffic over multiple VPN connections is described. A first Virtual Private Network (VPN) connection is established between a client device and a first VPN server via a a first access network of the client device. A second Virtual Private Network (VPN) connection is established between the client device and a second VPN server via a second access network of the client device. Application traffic associated with a connection between an application server and a client application that corresponds to the client device is received. The application traffic associated with the connection between the application server and the client application is distributed between at least the first VPN connection and the second VPN connection.

21 Claims, 8 Drawing Sheets

(51) Int. Cl.
*H04L 9/30* (2006.01)
*H04W 12/04* (2009.01)

(52) U.S. Cl.
CPC .............. *H04L 63/06* (2013.01); *H04L 63/08* (2013.01); *H04W 12/04* (2013.01)

(56) References Cited

U.S. PATENT DOCUMENTS

| | | | |
|---|---|---|---|
| 7,673,048 B1 * | 3/2010 | O'Toole, Jr. ........ | H04L 12/4633 370/229 |
| 7,724,732 B2 | 5/2010 | Guichard et al. | |
| 8,051,177 B1 | 11/2011 | Mitchell et al. | |
| 8,077,689 B1 | 12/2011 | Jones et al. | |
| 8,260,922 B1 | 9/2012 | Aggarwal et al. | |
| 8,559,449 B2 | 10/2013 | Rao et al. | |
| 8,566,452 B1 | 10/2013 | Goodwin et al. | |
| 8,607,301 B2 | 12/2013 | Carrasco | |
| 8,874,771 B2 | 10/2014 | Munger et al. | |
| 8,881,261 B1 | 11/2014 | Shigapov | |
| 8,910,273 B1 | 12/2014 | Fausak et al. | |
| 8,918,859 B2 | 12/2014 | Hilgenkamp | |
| 8,997,208 B2 | 3/2015 | Champagne et al. | |
| 2008/0022392 A1 | 1/2008 | Karpati et al. | |
| 2009/0122990 A1 * | 5/2009 | Gundavelli ......... | H04L 12/4641 380/278 |
| 2013/0067231 A1 | 3/2013 | Mudigonda et al. | |
| 2014/0096230 A1 | 4/2014 | Wade | |
| 2014/0150083 A1 | 5/2014 | Dinha et al. | |

OTHER PUBLICATIONS

Alizadeh, et al., "CONGA: Distributed Congestion-Aware Load Balancing for Datacenters", In Proceedings of the ACM Conference on SIGCOMM, Aug. 17, 2014, 12 pages.

Zhang, et al., "Implementation of the Load Balancing for Multiple VPN Server", In Proceedings of International Conference on Educational and Network Technology, Jun. 25, 2010, pp. 147-150.

McMurray, Andrew, "Rethink Networking Windows Server 20121 R2", Retrieved on: Jul. 23, 2015 Available at: https://www.google.co.in/url?sa=t&rct=j&q=&esrc=s&source=web&cd=1&cad=rja&uact=8&ved=0CB0QFjAAahUKEwi05aP5pfrGAhUMC44KHaMHDzs&url=http%3A%2F%2Fdownload.microsoft.com%2Fdownload%2F7%2F6%2F3%2F7632E216-0188-46D1-9B45-CDE2EA14CC64%2FWS2012R2_Networking.

Ford, et al., "TCP Extensions for Multipath Operation with Multiple Addresses", Published on; Jan. 2013 Available at: https://tools.ietf.org/html/rfc6824, 65 pgs.

Sinha et al, "Harnessing TCP's Burstiness with Flowlet Switching", 3rd ACM SIGCOMM Workshop on Hot Topics in Networks, Nov. 2004, 6 pgs.

"International Search Report and Written Opinion Issued in PCT Application No. PCT/US2016/064509", dated May 31, 2017, 11 Pages.

* cited by examiner

US 10,084,754 B2

VIRTUAL PRIVATE NETWORK AGGREGATION

BACKGROUND

A conventional Virtual Private Network (VPN) uses tunneling, encryption, and authentication to provide secure communications between two or more devices. For example, a client computing device may connect to a VPN server, and the client computing device may securely communicate with devices on a private network over the public network, such as the public internet, via the VPN server. Although VPN technology is relatively secure, it is possible to compromise VPN security. In particular, it is possible for a "man in the middle" attack to result in the data being compromised. In such an attack, a nefarious actor may be able to capture the data being transmitted across a VPN connection, and the attacker may be able to introduce data into the connection.

Mobile devices often have multiple radios and other network interfaces, and many devices have the ability to connect to multiple networks simultaneously. A VPN network may be established by a client device to a VPN server using a preferred network, such as a WiFi network, rather than a more expensive mobile data connection.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Examples of the present disclosure provide VPN aggregation in which client-side logic establishes multiple VPN connections to a common destination, such as an application server. When two or more networks are used to establish separate VPN connections, the client-side logic employs various techniques to distribute traffic associated with a single destination, and application connection, across the multiple VPN connections. Distributing the traffic across the multiple VPNs may improve the available bandwidth for the application traffic. Using multiple VPNs may also improve the security of the connection. An attacker who managed to compromise one VPN tunnel would not be able to obtain all of the data unless the attacker was able to compromise both VPN tunnels.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
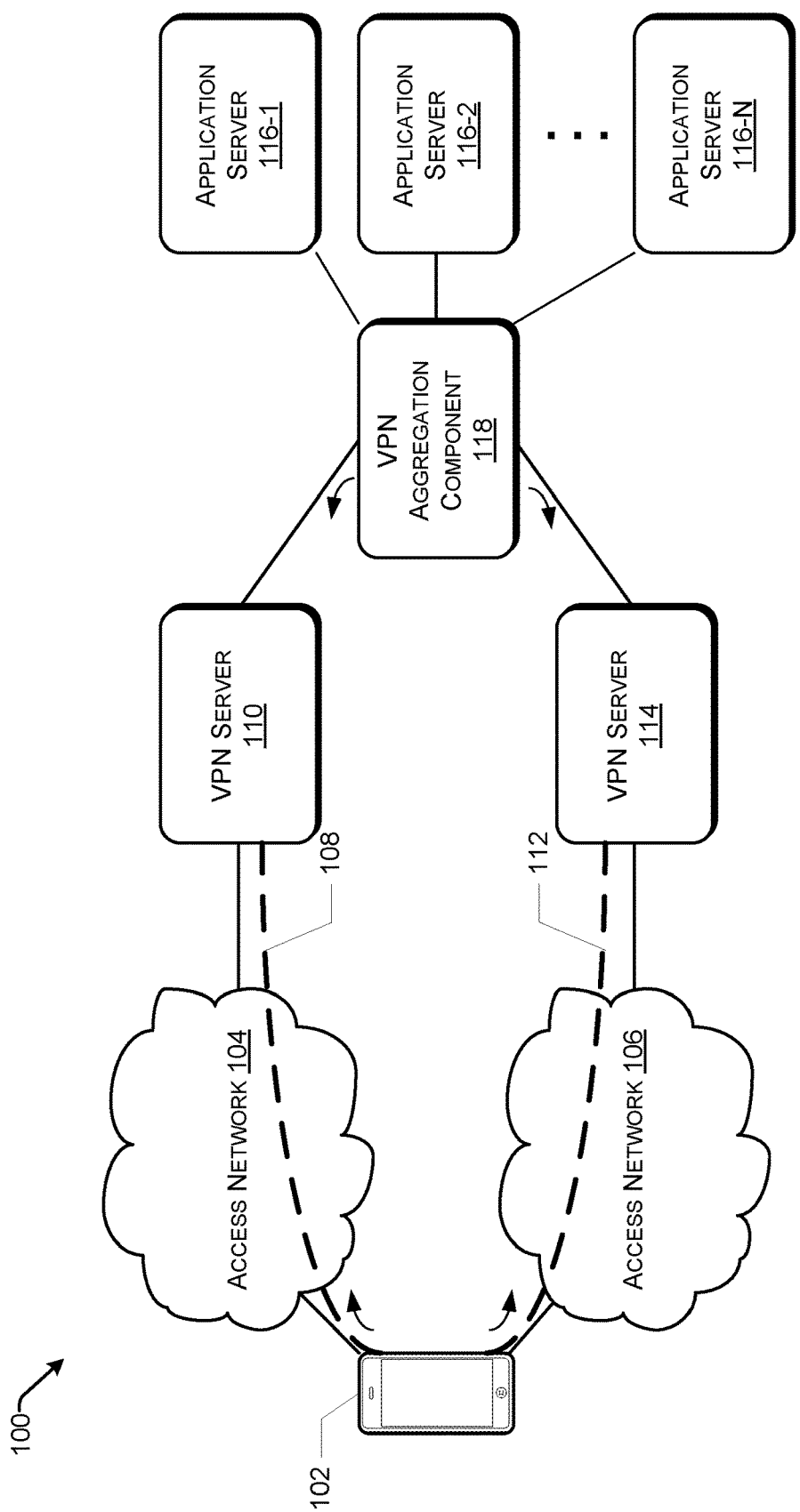
FIG. 1 is a block diagram that illustrates an example environment for aggregating multiple VPN connections.

Embodiments of the present application include aggregation of VPN tunnels in which a client device—such as a client computing device, network edge device (such as a router), or other client device—communicates to a single destination (such as an application server) using two or more VPN connections. The client device includes VPN aggregation logic that selects two or more access networks over which to establish VPN connections to two or more VPN servers. The client device distributes the traffic amongst the two or more VPN connections. A VPN aggregation component associated with one or more of the VPN servers, or associated with the application server, receives all of the application traffic, reorders the traffic if necessary, and forwards it to the application server. A similar communication occurs in the other direction. The VPN aggregation component receives from the application server (or other endpoint of the communication session) traffic addressed to the client device. The VPN aggregation component distributes the traffic amongst the VPN servers. The client-side VPN aggregation logic receives the traffic and provides the data to the client-side application. By distributing traffic between a client and a server amongst multiple VPN connections, embodiments may improve the overall data throughput available for an application connection. Also, by distributing traffic between a client and a server over multiple VPN connections, embodiments may improve the security of VPN connections. An attacker employing a "man in the middle" exploit, for example, may compromise one of the VPN connections, but would find it difficult to simultaneously compromise both VPN connections, especially where the two VPN connections are established over different interface devices, over different access networks, and/or using different VPN tunneling, VPN encryption, VPN encryption keys, authentication credentials, and so forth.

In some embodiments, the client-side logic breaks up data flows into multiple portions, which may be referred to herein as "flowlets." Flowlets contain one or more packets or frames of a data flow. Different flowlets from a single flow may be distributed amongst multiple VPN connections, such as based on a connection-hopping pattern that an attacker may find difficult to determine. The flowlets may be distributed over the VPN connections based on round-trip delay times, measured throughput, or other performance data in order to provide increased traffic flow or to reduce the number of packets received by the VPN aggregation component out of order. Embodiments may provide different flow distribution techniques to different applications, thereby providing a different balance between performance and security for different applications. For example, the client-side logic might utilize a single VPN connection for some applications, in order to improve low-latency performance for real-time applications, such as for audio or video applications. The client side-logic may provide increased security and/or throughput performance for another application such as by breaking up application traffic into flowlets and transporting the flowlets using different VPN connections. Other schemes for distributing the traffic over the multiple VPN tunnels may be used without departing from the scope of embodiments.

As used herein, "flow" refers to data communication traffic, including bidirectional traffic, which is defined by an application communication session (or just "application session") between an application and an application server. Some example applications include web browsers, email clients, file transfer protocol clients, file servers, media player applications, mobile phone apps, and so forth. An application server may include a web server, an email server, an FTP server, a media server, a file server, and so forth. An application communication session includes a communication session between an application and an application server, although a communication session may be between two client devices, or between two server devices. A communication session may also be multi-point. A single application communication session may be defined or determined by some or all of a 5-tuple of source address, destination address, protocol, source port, and destination port. The source and destination address may include an Internet Protocol (IP) address, such as an IP version 4 (IPv4) or IP version 6 (IPv6) address. Other source and destination address types may additionally be used such as Media Access Control (MAC) addresses, or others.

The protocol in the 5-tuple may include Transport Control Protocol (TCP), User Datagram Protocol (UDP), Stream Transmission Control Protocol (SCTP), Datagram Congestion Control Protocol (DCCP), as well as many others. These protocols may generally fall under or may be referred to as belonging in the "transport layer" of the Open Systems Interconnection model (OSI model), although such protocols may not strictly conform the definitions provided by the OSI model for a transport layer protocol. To the extent that "transport layer" or other OSI model term (such as application layer, network layer, "layer 2," etc.) are used herein to describe a protocol or other concept, usage of these OSI terms are not meant to imply that any such protocol or concept strictly conforms to the definitions within the OSI model, although it is possible that such protocols or concepts do meet those definitions.

The destination port information in the 5-tuple may indicate various higher-layer protocols (e.g., application layer protocols under the Open Systems Interconnection model (OSI model). Such higher-layer protocols include, in some embodiments, hyper text transfer protocol (HTTP) (often but not necessarily indicated by TCP or UDP port 80), HTTP Secure (HTTPS) (often but not necessarily indicated by TCP or UDP port 443), FTP (often but not necessarily indicated by TCP or UDP port 20 (for data transfer) and port 21 (for FTP control)), Secure Shell (SSH) (often but not necessarily indicated by TCP or UDP port 22), Real Time Transfer Protocol (RTP) (often but not necessarily indicated by TCP or UDP port 5004). The higher-layer protocols may include various email-based protocols such as various versions of Post Office Protocol (POP, such as POP 2POP3) (often but not necessarily indicated by TCP or UDP port 109 (POP2) or port 110 (POP3), various versions of Internet Message Access Protocol (IMAP, such as IMAP4) (often but not necessarily indicated by TCP port 143), Microsoft® Messaging Application Programming Interface (MAPI) (often but not necessarily indicated by TCP or UDP port 135), Simple Mail Transfer Protocol (SMTP) (often but not necessarily indicated by TCP or UDP port 25), and so forth. Other example destination ports and associated higher-layer protocols may be used without departing from the scope of embodiments. There are tens of thousands of official, registered, and unofficial TCP and UDP ports defined and in use, and embodiments are not limited to one or more of them. Also, although a port number may be an official port for a particular protocol (as defined for example by the Internet Assigned Numbers Authority (IANA)), other ports may be associated with a particular protocol. For example, although port 443 may be the official port for HTTPS, a client and an application server may be configured to utilize some other port number to indicate an HTTPS connection.

The source port information in the 5-tuple may be any port number associated with the packet. Source ports are often utilized by clients and application servers to distinguish traffic from amongst multiple application requests. Thus, where the same client device sends multiple packets having same source address, destination address, protocol, and destination port, but the packets have different source ports, the different source ports may indicate that the packets are associated with different communication sessions between the same client or client application and the application server. For example, a web browser client software on a client device may establish two HTTP connections to the same application server, such as in two different browser windows, to obtain different web pages, and this may (although it might not) result in multiple source ports being utilized, and thus result in two application communication sessions. In embodiments, one or more of the 5-tuple data may be used to define or determine an application communication session, such that all packets having the same 5-tuple elements (same source and destination address, protocols, and same source and destination ports) are treated as belonging to the same communication session, and thus to the same "flow."

The communication sessions may be determined or defined based on other data besides the above-described 5-tuple, such as higher-layer protocol data flow data. In some embodiments, the client-side aggregation logic or the server-side VPN aggregation component may determine a session from state information found in the higher-layer traffic flows. To use HTTP as just one example, an HTTP session may be defined based on a client and an HTTP server exchanging a SYN and SYN_ACK commands to request and accept a TCP session to be established between the client and server. These exchanges may be followed by exchanges of requests by the client for data from the server such as by issuing HTTP_GET commands and HTTP_200_OK replies, and other types of HTTP exchange communications. The HTTP session may end with an issuance of a FIN command and an ACK reply. Thus, embodiments may determine an application communication—or "flow"—based on the lifecycle of the TCP session.

These example group of communications—whether defined or determined based on some or all of the addresses/protocol/ports 5-tuple, higher-layer state information (such as HTTP or other state data as described above), some combination of the 5-tuple and higher-layer protocol data, other data as may be appropriate—represent a communication session, also referred to as a "flow." A "flowlet" represents a subset of the total set of flow data within an application session. In embodiments, some of the data packets having the same addresses, protocol, and ports (e.g., a flowlet) may be transmitted over a first VPN connection, while other packets having the same addresses, protocol, and ports may be transmitted over a second VPN connection. Also, return traffic (e.g., traffic from server to client) may be considered part of the same flow. Thus, from the perspective of the server, the destination addresses and destination ports will be the source addresses and the source ports of the client device. And the source addresses and the source ports of the server will be the destination addresses and the destination ports of the client. But such packets in both directions are considered part of the same flow.

Various schemes to distribute the flowlets from a single flow over multiple VPN connections are employed in various embodiments. For example, flowlets may be alternatingly transmitted over multiple VPN connections, a connection-hopping scheme may be employed, a load-balance algorithm may be employed to distribute the traffic across multiple VPN connections, and so forth. The load balance algorithms may be utilized to increase data throughput, such as by utilizing a both VPN connections to increase the available data throughput. The load balancing algorithms may be employed to reduce or minimize the number of packets received out of order. Since using more than one connection of some kind, such as a VPN connection, to send traffic to the same destination may result in packets received out of order, there may be a cost in terms of performance in re-ordering the packets at the receiver. Thus, a load-balancing algorithm may be employed on the sender side (whether the client or the server) to balance the flowlets to reduce or minimize the number of packets received out of order.

A VPN connection as used herein may employ one or more of tunneling, encryption, authentication, and other measures, to communicate between a VPN client and a VPN server. Tunneling protocols may include any of various schemes to carry network traffic packets or frames within the data payloads of other network traffic packets or frames. For example, various layer 2 protocol frames (according to the OSI model, such as Ethernet frames or other) may be placed into data payloads of IP packets and transported over an IP network, at which point the layer 2 frames are extracted and forwarded to a next hop or to their destination. In another example, layer 3 packets (such as IP packets or other) may be placed in to data payloads of other IP packets and transported over an IP network to a VPN server, where the encapsulating IP packets are removed and the original layer 3 packets are then forwarded to a next hop or their destination.

Embodiments may utilize any of various encryption standards to encrypt data being transported across VPN connections. Such encryption standards include, but are not limited to Data Encryption Standard (DES), Triple-DES, Advanced Encryption Standard (AES), RSA (Rivest, Shamir, and Adleman) standard, and others. Such encryption standards may use an encryption key (either a shared secret key or a public key) to encrypt data before transmission, and either the shared secret key or a private key counterpart to the public key to decrypt received data.

Various methods of cryptography may also be utilized to authenticate and verify the integrity of messages from senders in a VPN connection. For example, a digital signature or message authentication code may be generated and included with data transmitted over the VPN connections. The digital signature or message authentication code may be used by the receiver to verify that the data was transmitted by a known sender. In one example, a hash of the message (e.g., the data in the data payload or some other known data) is generated, and a private key of the sender is used to generate a cipher of the hash. The cipher of the hash is the signature. The receiver receives the message including the signature. The receiver decrypts the message and checks that the hash of the decrypted message is the same as the decrypted signature. If they do not match, then the message is not authenticated. Similarly, various other methods of authentication may be utilized when establishing a VPN connection, such as usernames, passwords, and so forth. Embodiments may utilize different tunneling protocols, encryption protocols, authentication credentials, encryption keys, and so forth for different VPN connections. That way, an attacker that is able to compromise one VPN connection is not able to re-use authentication credentials or keys to compromise another VPN connection established by the VPN client.

Various examples are described below with respect to the figures. These examples are merely exemplary, and embodiments of the present disclosure are not limited to the examples described below and illustrated in the figures.

FIG. 1 is a block diagram that illustrates an example environment 100 for aggregating multiple VPN connections. A client device 102 is configured to simultaneously access network 104 and access network 106. The client device 102 may access these networks utilizing any of various wired or wireless communications technologies. The access network 104 and the access network 106 may be any of various wireless networks, such as but not limed to any of various IEEE 802.11 Wireless LAN compliant networks, mobile communications networks such as Global System for Mobile Communications (GSM), Long-Term Evolution (LTE) networks, and so forth. The access network 104 and the access network 106 may include any of various personal area networks including but not limited to IEEE 802.15, Bluetooth®, and so forth. The access network 104 and the access network 106 may include wired connections, including but not limited to wired Ethernet networks, such as those defined by IEEE 802.3, fiber-optic networks, and so forth. The access network 104 and the access network 106 may provide access to the public Internet, or to other wide area networks, to campus-area networks, metropolitan area networks, and local area networks, and so forth. Other types of networks may be utilized without departing from the scope of embodiments. The access network 104 and the access network 106 may be different types of access networks—such as a WiFi (802.11) network and a mobile LTE network, but some embodiments of the client device 102 may be configured to access multiple networks of the same type simultaneously.

The client device 102 establishes a VPN connection 108 to VPN server 110 and a VPN connection 112 to VPN server 114. VPN connection 108 and VPN connection 112 are active at the same time, even if not established at the same moment in time. The client device 102 and the VPN server 110 may establish VPN connection 108 to utilize one or more of tunneling, encryption, and authentication credentials. The client device 102 and the VPN server 114 may establish VPN connection 112 to utilize one or more of tunneling, encryption, and authentication credentials. VPN connection 108 and the VPN connection 112 may use different encryption keys, different authentication credentials, different tunneling protocols, different encryption standards, and so forth. That way, an attacker that is able to compromise one VPN connection is not able to re-use authentication credentials, encryption keys, encryption standard exploits, and so forth from the compromised VPN connection to compromise another VPN connection established by the client device 102.

When communicating with application server 116, the client device 102 distributes flowlets of an application flow associated with an application executing on the client device 102 amongst the VPN connection 108 and the VPN connection 112. The distribution of flowlets may be based on several schemes, described in more detail elsewhere in this Detailed Description. A VPN aggregation component 118 receives the application traffic from the VPN server 110 and the VPN server 114 and forwards it to the application server 116.

The application server 116 may transmit data to the client device 102 via the VPN aggregation component 118 within the same communication session or flow. The VPN aggregation component may distribute one or more flowlets of this return application flow traffic using the VPN connection 108 and the VPN connection 112, such as by forwarding some flowlets to the VPN server 110 and forwarding some flowlets to the VPN server 114. The client device 102 includes a VPN aggregation component (described in more detail elsewhere within this Detailed Description) that receives the flowlets from the VPN connection 108 and the VPN connection 112. The VPN aggregation component of the client device 102 may provide the data packets to the client application executing in the client device 102.

The VPN server 110, the VPN server 114, the VPN aggregation component 118 and the application server 116 may reside on one or more computing system nodes within a data center or other network environment. These components are shown as separate components within FIG. 1 for the sake of illustration only, and this is not meant to imply that these components are housed in separate physical computing system nodes, although they may be. For example, the VPN server 110 and the VPN server 114 may be both present on a single server node. The VPN aggregation component 118 may be present on the same physical server node as the application server 116. The VPN aggregation component 118 may be present on the same physical server node as one or more VPN servers, such as one or both of the VPN server 110 and the VPN server 114. Several examples of distributing these components amongst multiple server nodes can be found elsewhere in this Detailed Description.

The VPN aggregation component 118 may reorder packets associated with a particular application flow that arrive out of order before forwarding the packets of the application flow to the application server 116. The reordering of packets may be based on sequence numbers, such as TCP sequence numbers, or other sequence number or other data in the application flow. In some embodiments, the VPN aggregation component 118 may not reorder the packets. The application server 116 may reorder the data packets upon receipt. Similarly, the VPN aggregation component on the client device 102 may reorder packets that arrive out of order before forwarding them to the client application executing on the client device 102, although it may forward the packets without reordering them.

The client device 102 and the VPN aggregation component 118 and the client device 102 may employ various means to avoid or reduce the number of out-of-order packets. The client device 102 and/or the VPN aggregation component 118 may utilize one or more of round-trip delay times of the VPN connections, available bandwidths of the VPN connections, or measured throughputs of the VPN connections to determine a ratio of packets to be sent over the multiple VPN connections to avoid or reduce out-of-order arrivals. For example, knowing that VPN connection 108 has a round trip delay time of 110 milliseconds (ms) and that the VPN connection 112 has a round trip delay time of 90 ms, the client device 102 and/or the VPN aggregation component 118 can estimate when packets sent will arrive at the other end. Using this information, the client device 102 and/or the VPN aggregation component 118 may queue the transmit orders of the packets as they are transmitted over the VPN connections 108 and 112 so that they are estimated to arrive in their proper order. The packets may be sent out of order so that their predicted arrival times are in order.

The VPN aggregation component 118 and the client device 102 may monitor the arrival order of packets and signal to each other to adjust their transmission. The VPN aggregation component 118 may determine whether packets arriving from the client device 102 over the VPN connection 108 and the VPN connection 112 arrive out of order. The VPN aggregation component 118 may determine a metric that indicates how bad the out-of-order arrival problem is for a certain aggregated VPN connection, such as a percentage of packets that arrive out of order or a displacement metric that indicates how far out of order out-of-order packets arrive (e.g., arriving X number of packets early or late). Based on the determined metric, such as based on the determined metric meeting or exceeding a threshold, the VPN aggregation component 118 may signal to the client device 102 to adjust the transmission of packets to reduce the number of packets that arrive out order. The sender may adjust, responsive to the signal, a ratio of packets, the sizes of the flowlets, or the cadence of packets (the time intervals between sending packets), that it distributes or causes to be distributed via the multiple VPN tunnels in order to reduce the number of packets that arrive out of order. For example, where packets arriving in flowlets across VPN connection 108 tend to arrive out of order, the VPN aggregation component 118 may signal to the client device 102 to transmit fewer packets over VPN connection 108 so that a percentage of out-of-order packets goes down, or so that a displacement of packets that arrive out-of-order is reduced. Similarly, the client device may also monitor the packets' arrival order, determine a metric, and signal to the VPN aggregation component 118 to adjust the ratio of packets, size of flowlets, or cadence of packets that are transmitted to the client device 102 via VPN connection 108 and VPN connection 112.

The client device 102 and the VPN aggregation component 118 may employ various load balancing schemes to distribute the flowlets over the VPN connections 108 and 112. In some embodiments, available bandwidths and/or measured throughput (either real-time or historic throughput) may be utilized to establish a ratio of packets that are sent down the multiple VPNs. For example, if the access network 104 has a measured throughput of X megabits per second (Mbps), and access network 106 has a measured throughput of Y Mbps, the client device and the VPN aggregation component 118 may transmit packets in a ratio of X of every X+Y packets using VPN connection 108 and every Y of every X+Y packets using VPN connection 112.

The client device 102 and/or the VPN aggregation component 118 may take advantage of the bursty nature of some traffic types to distribute the flowlets amongst the multiple VPN connections. Some traffic flows, such as much data traffic (web browsing, emails, and so forth), and even IP telephony traffic, video, and other audio traffic, include periods of inactivity mixed with bursts of data. The client device 102 and the VPN aggregation component 118 may identify a "burst" of traffic, and designate the burst as a "flowlet." To determine a burst, the client device 102 and the VPN aggregation component may determine that a threshold time period of transmission inactivity has passed between the arrival of data packets to be transmitted over the multiple VPNs. Thus, packets generated for transmission that are more than the threshold time period since the most recently transmitted packets may be considered a new burst, and designated as a new flowlet, and therefore transmitted using a different VPN connection. This may assist in making sure that packets do not arrive out of order, since the time periods between bursts may be larger than the slowest delay times of the VPN connections, such that data bursts sent on different VPN connections are likely to arrive much after the previous burst was sent, even if the previous burst was transmitted on a slower (higher delay) VPN connection. Other metrics or thresholds besides time period of transmission inactivity may be used to determine a burst. For example, a burst may be defined by a response to a request, such as defined by higher-layer protocol flows. Transmission of a new request, or transmission of an acknowledgement, by a receiver may mark the beginning of a new burst.

The client device 102 and/or the VPN aggregation component 118 may utilize a connection hopping scheme to distribute the flowlets amongst the VPN connections. A connection hopping scheme may be usable to determine an order in which the VPN tunnels are used to transmit one or more packets (e.g., transmit a flowlet). For example, where there are two VPN connections (e.g., VPN connection 108 and VPN connection 112) a pattern is determined by both the client device 102 and the VPN aggregation component 118 using some shared secret information. The shared secret information may be a shared key (including reuse of a shared key used to encrypt or decrypt data over one or more of the VPN connections), although it could be any data known to both the client device 102 and the VPN aggregation component 118 and unlikely to be guessed or captured by another party. An algorithm, such as a random number generator, may be seeded with the shared secret information to output random number, which can be used to determine an order over which the flowlets are transmitted over the VPNs. For example, an algorithm accepting a shared secret as input may output the following bit pattern:

00001011111000100010010100010 . . . .

This algorithm is executed on both the client device 102 (e.g. the transmitter) and the VPN aggregation component 118 (e.g., the receiver). Once transmission is synchronized between the sender and transmitter, the client device 102 and the VPN aggregation component 118 are configured to utilize the output bit pattern to indicate the order. Using the example, the client device 102 and the VPN aggregation component 118 may interpret "0" as VPN connection 108 and "1" as VPN connection 112. Thus, the client device 102 transmits flowlets (e.g., one or more packets of the application communication session) such that the first four are transmitted over VPN connection 108 followed by one flowlet over VPN connection 112, followed by another flowlet over VPN connection 108, followed by five flowlets over VPN connection 112, and so on. When utilizing a connection hopping scheme, the client device 102 and the VPN aggregation component 118 may utilize a connectionless protocol, such as UDP, or otherwise obfuscate the order of packets sent over the multiple VPN connections. For example, TCP sequence numbers in the packets may be removed or replaced with meaningless data such that an attacker that has compromised both VPN connections is not easily able to guess the order in which the data is to be reconstructed on the receiver end.

Other flowlet distribution schemes may be utilized according to some embodiments. For example, the client device 102 may transmit down one VPN connection, such as VPN connection 108 and the VPN aggregation component 118 may transmit down another VPN connection 112. Thus, egress traffic is distributed to one VPN connection, and ingress traffic is distributed to another. This may improve security while maintaining performance for some applications. For example, distributing all ingress traffic to one VPN connection may ensure that two-way voice, video, or other real-time type traffic does not arrive out of order or with unsuitable jitter, while at the same time making it more difficult for an attacker that has compromised one VPN connection to capture the entire two-way conversation.

The client device 102 and the VPN aggregation component 118 may distribute flowlets from different applications using different schemes. For example, a connection hopping scheme may be utilized to determine flowlet distribution for a flow from a first application and a pure alternating pattern for a second application. This may be true even for flows for different applications that occur in the same or overlapping time periods. The selection of distribution scheme may be based on a policy, which may be configurable, that indicates that some applications are to be treated with increased security while others are to be treated with more performance, or somewhere in between. Where performance is indicated in the policy as being more important, a distribution scheme to one or more of reduce out-of-order arrival, reduce delay times, improve data throughput, etc. may be employed. A highest performance option may include utilizing only a single VPN connection for traffic for that application (such as a highest-bandwidth and/or fastest delay time VPN connection). Where security is indicated in the policy as being more important, a scheme to distribute traffic to increase the randomness of the flowlet distribution across the multiple VPN connections may be utilized (such as by utilizing a connection-hopping scheme or other). As noted above, a balance of performance and security may achieved by, for example, sending all egress traffic using one VPN connection and receiving all ingress traffic on another VPN connection. Also, selection of the access network, or the VPN connections, may be based on performance metrics as well. In some embodiments, all flows between the client device 102 and the VPN aggregation component are grouped together, with a single distribution scheme for all data traffic.

Selection of access networks to connect to for establishment of VPN connections in the first place may be based on security considerations, performance considerations, cost considerations, location, or based on other factors. Policies may be present on the client device 102, which indicate to determine to prefer certain types of access networks to other types. For example, WiFi networks may be preferred over mobile networks for cost reasons, or mobile networks may be preferred over public WiFi networks for security reasons. A high-speed WiFi connection may be preferred over a mobile connection with a relatively weak signal, or with a low measured throughput.

The client device 102 may be configured to utilize more than one access network, and to establish multiple VPN connections, based on location information. In a location with known security, such as at a corporate location, or in a location with available connectivity to a mobile network within a country or jurisdiction with known secure mobile networks, only a single access network may be utilized to establish a single VPN connection. In other instances, such as where the client device 102 is in a location or jurisdiction with uncertain mobile network security, or in a location with multiple unsecured networks (e.g., unsecured or public WiFi networks), multiple access networks may be selected in order to establish multiple VPN connections. Various means to determine location may be utilized, such as based on global positioning satellite (GPS) receivers in the client device 102, based on mobile network triangulation information, network data, network addresses, or other data. In some embodiments, the configuration may be dynamically signaled from the VPN aggregation component 118. This may include additional control channel elements including time synchronization information (or references to secure time servers); risk assessments for the networks that the client is currently connected to (or plans to connect to). This enables the client device 102 and VPN aggregation component 118 to dynamically manage the "security/performance" ratio.

Additional security measures may be utilized in some embodiments. For example, "dummy" packets (e.g., packets having useless data) may be sent over one or multiple VPN connections in order to confuse an attacker that has compromised one of the VPN connections. The dummy packets may be transmitted using a known pattern so that the receiver or VPN aggregation component 118 is able to disregard them.

FIG. 1 is illustrated as having two access networks 104 and 106 through which the client device 102 establishes VPN connections 108 and 112, respectively. But embodiments are not limited to utilization of only two access networks, and they are not limited to two VPN connections. In some embodiments, two or more VPN connections may be established over a single access network to two or more VPN servers. In some embodiments access network 104 and access network 106 may be physically the same network, but the client device 102 may include two network interface components that interface with the same access network to establish two different connections to the same network. An example may be two 802.11 wireless Ethernet cards on the client device 102 that each establish separate wireless connections to the same 802.11 wireless network, and utilize those two connections to establish two VPN connections. Another example may be a dual subscriber identity module (dual-SIM) client device, which establishes two separate connections to the same mobile wireless network simultaneously, and utilizes those two network connections to establish two VPN connections. Two wired Ethernet ports may also be utilized to establish two wired Ethernet connections to the same Ethernet access network. Other examples are possible without departing from the scope of embodiments.

Figure 2:
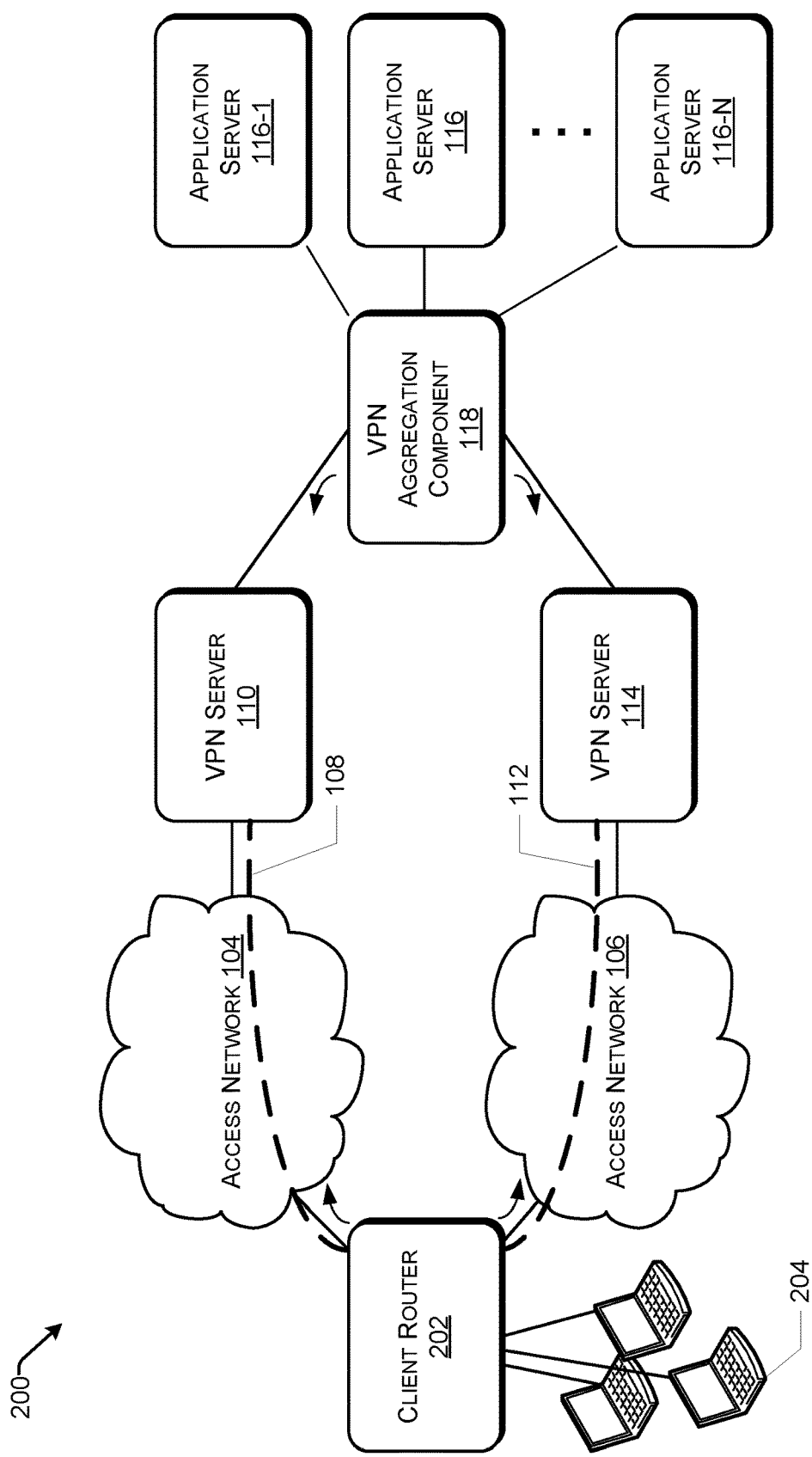
FIG. 2 is a block diagram that illustrates an example environment for a router client device 202 aggregating multiple VPN connections.

FIG. 2 is a block diagram that illustrates an example environment 200 for a router client device 202 aggregating multiple VPN connections. The router client device 202 connects to multiple access networks, such as the access network 104 and the access network 106. The router client device 202 establishes multiple VPN connections, such as the VPN connection 108 and the VPN connection 112, which are maintained concurrently for distribution of flowlets. The operation of the router client device 202 is similar to the operation of client device 102. The router client device interfaces with one or more devices 204, thereby providing them with access to the application server 116, via the VPN connections 108 and 112, the VPN servers 110 and 114, and the VPN aggregation component 118. The router client device 202 distributes flowlets over the multiple VPN connections in a way that is similar to or the same as the client device 102. For example, the router client device 202 may alternate distribution of packets between VPN connections 108 and 112. The router client device 202 may utilize a connection-hopping scheme. The router client device 202 may take advantage of the bursty nature of data traffic, and transmit bursts of data down different VPN connections. The router client device 202 may transmit egress traffic down one VPN connection and receive ingress traffic on another VPN connection. Other example distribution schemes may be utilized in the router client device 202 and the VPN aggregation component 118 without departing from the scope of embodiments.

In some embodiments, the router client device 202, like the client device 102, is configured to apply a varying balance between security and performance on a per-application basis. For example, email traffic may be transported using a connection hopping scheme to favor security over performance, and to distribute egress IP telephony traffic all down a single VPN connection to favor performance over security. As with the client device 102, the router client device 202 may be configured to apply policies—which may be configurable policies—to determine the balance of security and performance to be applied to traffic associated with different applications.

In some embodiments, one or more of the client devices 204 and the router client device 202 may perform multipoint VPN simultaneously. In these embodiments, the client devices 204 may establish VPN connections to VPN servers 110 and 114, whose traffic is passed inside the VPN connections 108 and 112 established by the router client device 202. While this may increase complexity, and increase a cost of performance and render troubleshooting more difficult, it may also increase security.

In some embodiments, the router client device 202 is configured to apply policies to determine a balance of security and performance to different ones of the devices 204. Thus, traffic from some devices 204 may be provided with a balance of security and performance such as by distributing different bursts across the different VPN connections, while other traffic from other devices 204 is provided with greater security using a connection hopping scheme, while still other traffic from still other devices 204 is provided with greater performance, transmitting all data down a single VPN connection. In addition, the traffic from different applications from different ones of the devices 204 may be treated individually. In one example, a first device 204 may have all of its traffic distributed using a connection-hopping scheme, while a second device may have its database access traffic transmitted using a connection hopping scheme, and its IP telephony traffic distributed based on data bursts. Such per-device application policies may also be configurable in some embodiments.

Figure 3:
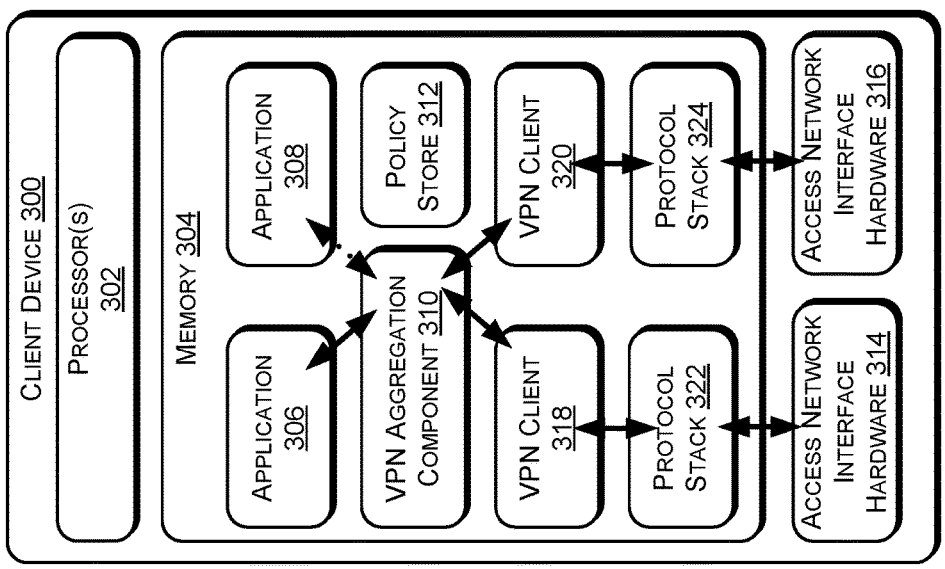
FIG. 3 illustrates a block diagram of an example client device enabled to utilize multiple VPN connections over multiple access networks.

FIG. 3 illustrates a block diagram of an example client device 300 enabled to utilize multiple VPN connections over multiple access networks. The client device 300 may be the same as or similar to the client device 102. The client device 300 includes one or more processors 302 and memory 304. Application 306 and application 308 are executed by the one or more processors 302. One or both of the application 306 and the application 308 generate network traffic for a network destination, such as the application server 116. In the example illustrated in FIG. 3, the application 306 generates traffic, which is passed to a VPN aggregation component 310.

The VPN aggregation component 310 emulates the networking stack of the client device 300. To accomplish this, the VPN aggregation component 310 may present itself as a network interface device driver to the application 306 and the application 308 (as well as to the other applications executing on the client device 300). The VPN aggregation component 310 may employ policies 312 to perform various functions. In some embodiments, the VPN aggregation component 310 selects the access networks. The VPN aggregation component 310, in some embodiments, may select the access networks by, for example, utilizing the access network interface hardware 314 and the access network interface hardware 316 to discover, monitor, and establish access network connections. In some embodiments, the client device 300 may also include one or more virtualized network interfaces with which the VPN clients 318 and 320 interface. This may be the case where, for example, the VPN clients 318 and 320 are instantiated as virtual machines or instantiated within virtual containers. Such virtual network interfaces pass traffic received from the VPN clients 318 and 320, via the protocol stacks 322, to the network interface hardware 314 and 316 for transmission (or to other virtualized components within the client device 300 such as a virtual switch, virtual router, and so forth). Ingress traffic received by the network interface hardware 314 and 316 are passed to the virtual network interfaces before they are provided to the protocol stacks 322 and 324 and the VPN clients 318 and 320. The VPN aggregation component 310 selects VPN servers with which to establish VPN connections. The VPN aggregation component 310 may make these selections based on policies 312.

The policies 312 may indicate the balance of security and performance to be applied to the traffic associated with applications 306 and 308. The policies 312 may indicate the type or types of VPN connections to be established based on available networks, including types of tunneling, types of encryption, encryption keys, authentication credentials, and so forth. The policies 312 may include a list of VPN servers (e.g., the IP addresses or resolvable names of the VPN servers). The policies 312 may also indicate that VPN servers are to be discovered using one or more discovery mechanisms.

The VPN aggregation component 310 may utilize VPN client 318 and VPN client 320 to establish VPN connections, via the access network interface hardware 314 and the access network interface hardware 316. Thus, a first VPN connection may be established to a first VPN server via the access network interface hardware 314 using a first access network, and a second VPN connection may be established to a second VPN server via the access network interface hardware 316 using a second access network. As noted elsewhere within this Detailed Description, the access network interface hardware 314 and the access network interface hardware 316 may access the same access network in some embodiments; thus, in these embodiments, multiple VPN connections may be established by the client device 300 using the same access network.

The VPN aggregation component 310 may cause the VPN connections to be established by the VPN client 318 and the VPN client 320 upon determining that traffic from an application—such as the application 306—is to be transmitted. The VPN aggregation component 310 may cause a first VPN connection to be established to one VPN server for traffic from application 308. Then, upon receiving traffic from application 308 (illustrated in FIG. 3 with a dashed line arrow), based on application 308 being designated by policies 312 as being afforded higher security, the VPN aggregation component 310 may establish a second VPN connection to a second VPN server, to provide increased security.

The VPN aggregation component 310 utilizes various distribution schemes to distribute flowlets amongst multiple VPN connections, as discussed in more detail elsewhere within this Detailed Description. In the example illustrated in FIG. 3, the VPN aggregation component 310 receives traffic from the application 308 (traffic flows are indicated by arrows). The VPN aggregation component 310 distributes the traffic amongst different VPN connections, such as by providing some of the traffic to each of VPN client 318 and VPN client 320. The VPN client 318 interfaces with a first protocol stack 322, which operates to forward the traffic via the access network interface hardware 314. The VPN client 320 interfaces with a second protocol stack 324, which operates to forward the traffic via the access network interface hardware 316. In some embodiments, instead of multiple protocol stacks, a single shared protocol stack that addresses multiple network interfaces may be used. Incoming traffic is received by the access network interface hardware 314 and the access network interface hardware 316, which is then passed up the protocol stack 322 and the protocol stack 324, respectively. The protocol stack 322 provides the traffic to the VPN client 318, and the protocol stack 324 provides the traffic to the VPN client 320. The VPN clients 318 and 320 provide the ingress traffic to the VPN aggregation component 310.

The VPN aggregation component 310 monitors the arrival of traffic. The VPN aggregation component 310 determines a metric that indicates an extent to which the ingress traffic arrives out of order, such as is described elsewhere within this Detailed Description. The VPN aggregation component 310 monitors the round-trip delay times and the throughput of the multiple VPN connections. The VPN aggregation component 310 takes various actions based on this information. The VPN aggregation component 310 may signal to a VPN aggregation component (such as the VPN aggregation component 118) to alter the ratio and/or cadence of packets transmitted across the multiple VPN connections to reduce the out-of-order arrival of packets. The VPN aggregation component 310 may alter the ratio and/or cadence of packets that it distributes across the VPN connections in order to reduce out-of-order arrival, or to increase the throughput of traffic across the aggregated VPN connections. For some or all of the applications executing on the client device 300, the VPN aggregation component 310 may re-order or discard the packets that arrive out of order. For some or all of the applications executing on the client device 300, the VPN aggregation component 310 may provide the out-of-order packets to the applications without re-ordering them. The applications themselves may re-order the packets, or discard the out-of-order packets. In some embodiments, the protocol stacks 322 and 324 may be utilized to re-order the packets. The VPN aggregation component 310 may send the packets back through one of the protocol stacks 322 or 324 (or a different protocol stack) to leverage the re-ordering logic included in some protocol stacks, such as where TCP is used. Since TCP and other protocols include re-ordering functions (such as based on sequence numbers), the packets may be re-ordered in this manner.

The VPN aggregation component 310 may load-balance across the multiple VPN connections, as described in more detail elsewhere within this Detailed Description.

Figure 4:
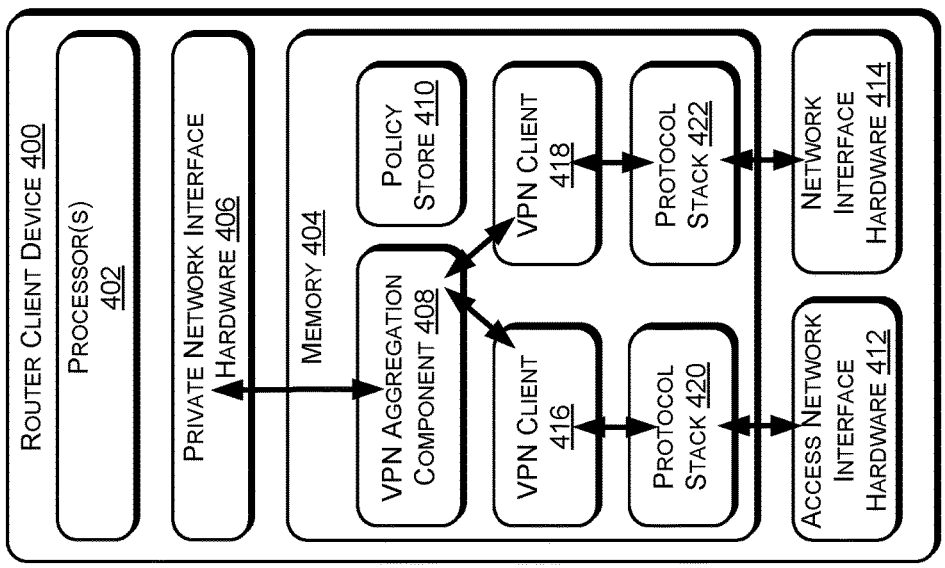
FIG. 4 illustrates a block diagram of an example router client device enabled to utilize multiple VPN connections over multiple access networks.

FIG. 4 illustrates a block diagram of an example router client device 400 enabled to utilize multiple VPN connections over multiple access networks. The router client device 400 may be the same as or similar to the router client device 202. The router client device 400 includes one or more processors 402 and memory 404. Private network interface hardware 406 receives network traffic from a plurality of devices (such as the devices 204). The router client device 400 includes functionality similar to a conventional access router, such as providing a default gateway for client devices accessing a network, and forwarding traffic to and from one or more access networks. The private network interface hardware 406 may be any of various network interface hardware types, including wired Ethernet, wireless Ethernet, and so forth. Embodiments are not limited to any type or types of private network interface hardware 406.

A VPN aggregation component 408 employs policies 410 to perform various functions. The VPN aggregation component 408 selects access networks and causes the router client device 400 to establish VPN connections to VPN servers over those access networks. The VPN aggregation component 408, in some embodiments, may select the access networks that the router client device 400 establishes access connections to, such as by utilizing the access network interface hardware 412 and the access network interface hardware 414 to discover, monitor, and establish access network connections. The VPN aggregation component 408 selects VPN servers with which to establish VPN connections. The VPN aggregation component 408 may make these selections based on policies 410.

The policies 410 may include the balance of security and performance to be applied to the traffic associated with application traffic. The policies 410 may indicate the type or types of VPN connections to be established based on available networks, including type of tunneling, type of encryption, encryption keys, authentication credentials, and so forth. The policies 410 may include a list of VPN servers. The policies 410 may also indicate that VPN servers are to be discovered using one or more discovery mechanisms.

The VPN aggregation component 408 may utilize VPN client 416 and VPN client 418 to establish VPN connections, via the access network interface hardware 412 and the access network interface hardware 414. Thus, a first VPN connection may be established to a first VPN server via the access network interface hardware 412 using a first access network, and a second VPN connection may be established to a second VPN server via the access network interface hardware 414 using a second access network. As noted elsewhere within this Detailed Description, the access network interface hardware 412 and the access network interface hardware 414 may access the same access network in some embodiments; thus, in these embodiments, multiple VPN connections may be established by the router client device 400 using the same access network.

The VPN aggregation component 408 may cause the VPN connections to be established by the VPN client 416 and the VPN client 418 upon determining that traffic from the private network interface hardware 406 is received. The VPN aggregation component 408 may cause a first VPN connection to be established to one VPN server for traffic from the devices 204. Then, upon receiving traffic from a particular application or from a particular device 204, that are designated by policies 410 as being afforded higher security, the VPN aggregation component 408 may establish a second VPN connection to a second VPN server, to provide increased security.

The VPN aggregation component 408 utilizes various distribution schemes to distribute flowlets amongst multiple VPN connections, as discussed in more detail elsewhere within this Detailed Description. In the example illustrated in FIG. 4, the VPN aggregation component 408 receives traffic from the private network interface hardware 406 (traffic flows are indicated by arrows). The VPN aggregation component 408 distributes the traffic amongst different VPN connections, such as by providing some of the traffic to each of VPN client 416 and VPN client 418. The VPN client 416 interfaces with a first protocol stack 420, which operates to forward the traffic via the access network interface hardware 412. The VPN client 418 interfaces with a second protocol stack 422, which operates to forward the traffic via the access network interface hardware 414. Incoming traffic is received by the access network interface hardware 412 and the access network interface hardware 414, which is passed up the protocol stack 420 and the protocol stack 422, respectively. The protocol stack 420 provides the traffic to the VPN client 416, and the protocol stack 422 provides the traffic to the VPN client 418. The VPN clients 416 and 418 provide the ingress traffic to the VPN aggregation component 408.

The VPN aggregation component 408 monitors the arrival of traffic. The VPN aggregation component 408 determines a metric that indicates an extent to which the arriving ingress traffic arrives out of order, such as is described elsewhere within this Detailed Description. The VPN aggregation component 408 monitors the round-trip delay times and the throughput of the multiple VPN connections. The VPN aggregation component 408 takes various actions based on this information. The VPN aggregation component 408 may signal to a VPN aggregation component (such as the VPN aggregation component 118) to alter the ratio and/or cadence of packets transmitted across the multiple VPN connections to reduce the out-of-order arrival of packets. The VPN aggregation component 408 may alter the ratio and/or cadence of packets that it distributes across the VPN connections in order to reduce out-of-order arrival, or to increase the throughput of traffic across the aggregated VPN connections. For some or all of the traffic associated with client applications and/or with devices 204, the VPN aggregation component 408 may re-order or discard the packets that arrive out of order. For some or all of the traffic associated with the client applications and/or with devices 204, the VPN aggregation component 408 may provide the out-of-order packets to the private network interface hardware 406 without re-ordering them. The applications and/or the devices 204 may re-order the packets, or discard the out-of-order packets.

The VPN aggregation component 408 may load-balance across the multiple VPN connections, as described in more detail elsewhere within this Detailed Description.

Figure 5:
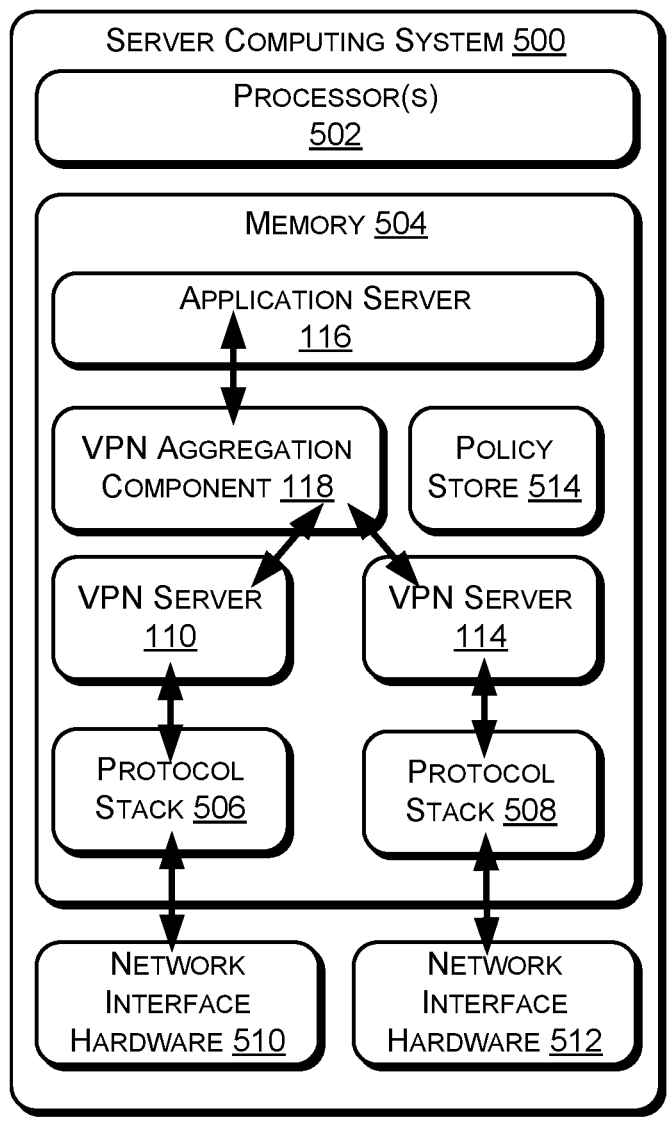
FIG. 5 illustrates a block diagram of an example server computing system enabled to aggregate multiple VPN connections.

FIG. 5 illustrates a block diagram of an example server computing system 500 enabled to aggregate multiple VPN connections. The server computing system 500 includes one or more processors 502 and a memory 504. The memory stores the VPN server 110, the VPN server 114, the application server 116 and the VPN aggregation component 118. In some embodiments, a single VPN server may be utilized to maintain multiple VPN connections with the same client device. The server computing system 500 may include one or more virtual machines or application containers, in which its various modules execute. Although the server computing system 500 is illustrated as including the VPN server 110, the VPN server 114, the application server 116 and the VPN aggregation component 118, server computing systems according to embodiments may include only some of these components. A data center environment, such as are illustrated in FIGS. 1 and 2, may utilize multiple physical host nodes to provide these components.

One or more of the VPN server 110, the VPN server 114, the application server 116, and the VPN aggregation component 118 interface with protocol stacks 506 and 508, which cause packets to be transmitted on, respectively, network interface hardware 510 and 512. The network interface hardware 510 and 512 receive packets and pass them up the protocol stacks 506 and 508. Traffic flows illustrated in FIG. 5 show that the traffic passes between the VPN server 110, the VPN server 114, the application server 116, and the VPN aggregation component 118 internally within the device. In a virtualized environment, an internal virtual switch or other component may route traffic to and from these components.

A policy store 514 may include various policies related to the VPN connection aggregation. The policy store 514 includes distribution policies for the connections to client devices. The policies in the policy store 514 may be established based on communication or negotiation with the client devices. This allows the client devices to influence or control how ingress traffic from the application server 116 is distributed across the VPN connections. In this way, distribution policies—including policies indicating to increase throughput, performance, security, and so forth—may be based on configurable or static settings on the client device. The policy store 514 may also include VPN connection policies, indicating for example the VPN tunneling protocols, encryption standards, encryption keys, authentication credentials, and so forth that are allowed for establishment and maintenance of the VPN connections.

Figure 6:
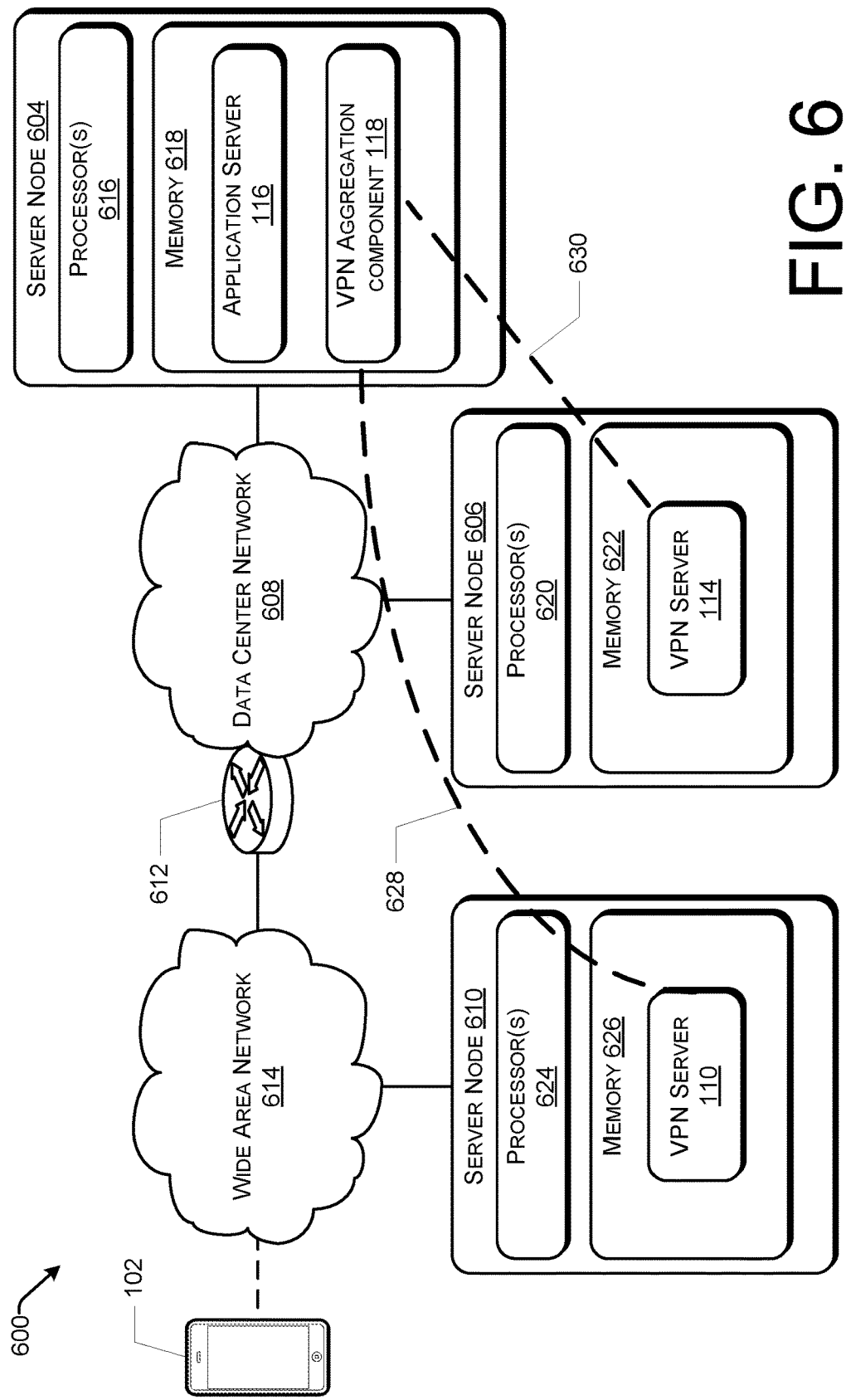
FIG. 6 is a block diagram that illustrates an example data center environment utilizing VPN connection aggregation amongst VPN servers in different locations.

FIG. 6 is a block diagram that illustrates an example data center environment 600 utilizing VPN connection aggregation amongst VPN servers in different locations. An increase in security may be obtained by locating the VPN servers 110 and 114 in different geographical locations or connected to different Internet service providers (ISPs). For example, the geographical separation of the VPN servers 110 and 114 may make it more difficult for a man-in-the-middle attacker to obtain access to the traffic on both VPN connections, even if the attacker were able to compromise both VPN connections.

In the example illustrated in FIG. 6, the application server 116 and the VPN aggregation component 118 are hosted on a host server node 604, while the VPN server 114 is hosted on a host server node 606. The host server node 604 and the host server node 606 may be in the same physical location, such as in a data center, and communicatively coupled to each other via a data center network 608. The VPN server 110 is hosted on a host server node 610, which may be in a separate physical location, including for example in an entirely different country or continent. The data center network 608 is communicatively coupled via one or more access devices 612 (e.g., routers or other networking devices) to a wide area network 614. The host server node 610 is also communicatively coupled to the wide area network 614. The VPN server 110 establishes communications with the VPN aggregation component 118 over which traffic from the VPN connection with the client device 102 is provided to the aggregation component. Also, the VPN server 114 establishes communications with the VPN aggregation component 118 over which traffic from the VPN connection with the client device 102 is provided to the aggregation component. These communications are carried over connections 628 and 630, which are illustrated in FIG. 1 with dashed lines. These communications between the VPN aggregation component 118 and the VPN servers 110 and 114 may be encrypted, and may be established over VPN connections, which may be different than the VPN connections established between the client device 102 and the VPN servers 110 and 114. The connections 628 and 630 may include private lines, Multiprotocol Label Switching (MPLS) connections, Frame Relay connections, and so forth. FIG. 6 also illustrates an embodiment where the VPN aggregation component 118 and the application server 116 are hosted on the same host server node 604, and the VPN server 110 and the VPN server 114 are hosted on other server nodes. Other arrangements are possible without departing from the scope of embodiments.

The host server node 604 includes one or more processors 616 and memory 618. The memory 618 stores the application server 116 and the VPN aggregation component 118, which are executable by the one or more processors 616. The host server node 606 includes one or more processors 620 and memory 622. The memory 622 stores the VPN server 114, which is executable by the one or more processors 620. The host server node 610 includes one or more processors 624 and memory 626. The memory 626 stores the VPN server 110, which is executable by the one or more processors 624.

Figure 7:
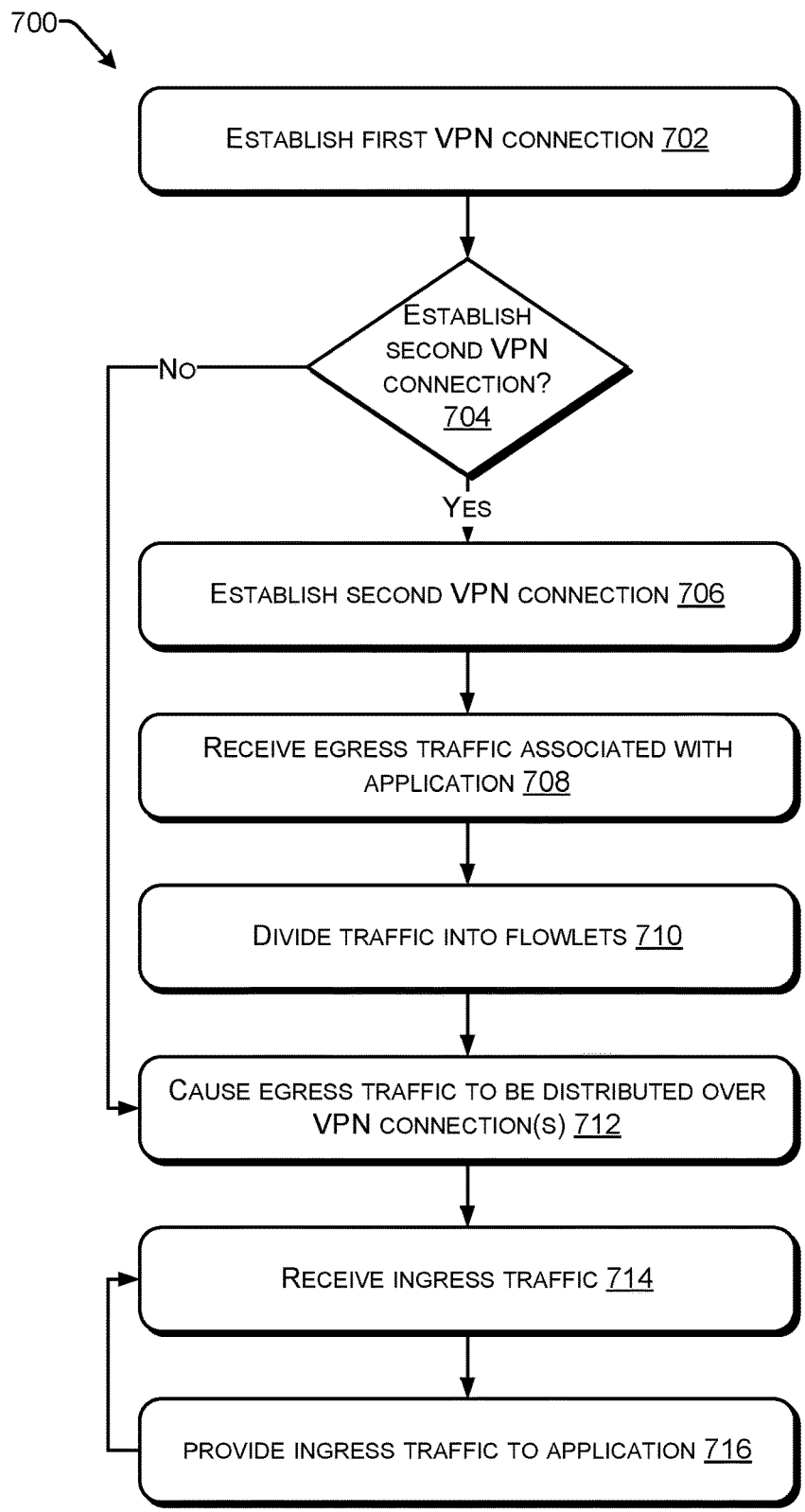
FIG. 7 illustrates a flow chart depicting an example process for a client device distributing traffic amongst multiple VPN connections.
Figure 8:
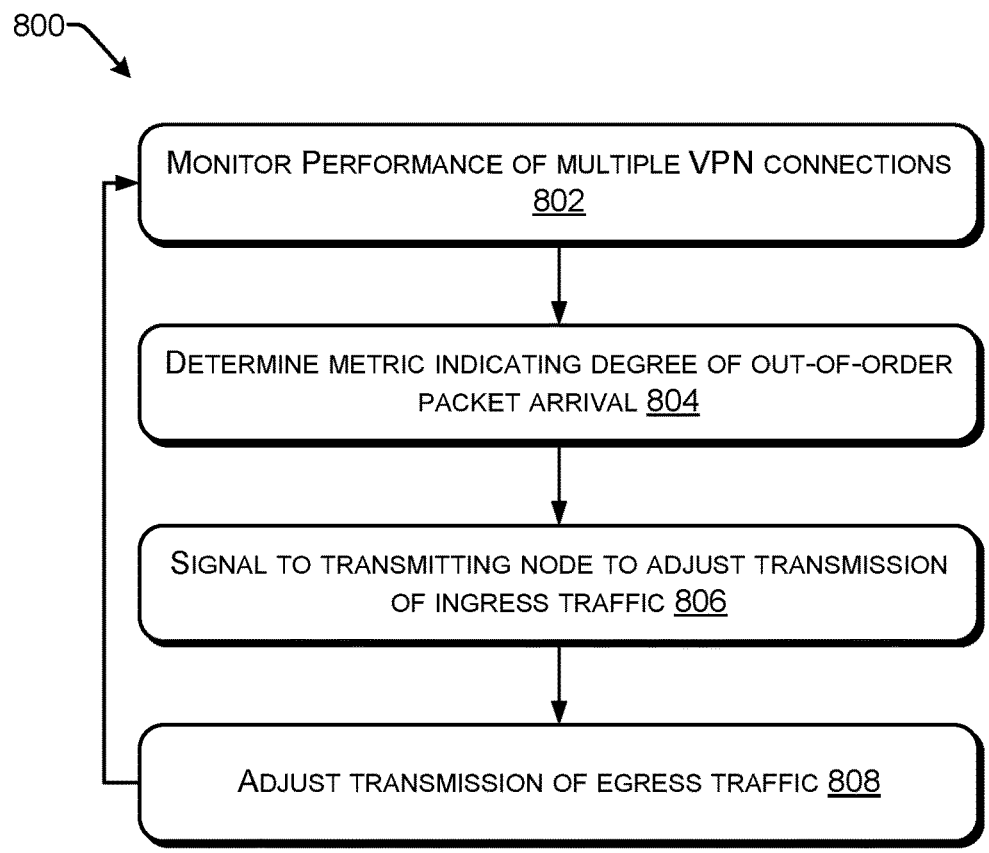
FIG. 8 illustrates a flow chart depicting an example process for monitoring and adjusting distribution of traffic over multiple aggregated VPN connections.
Figure 9:
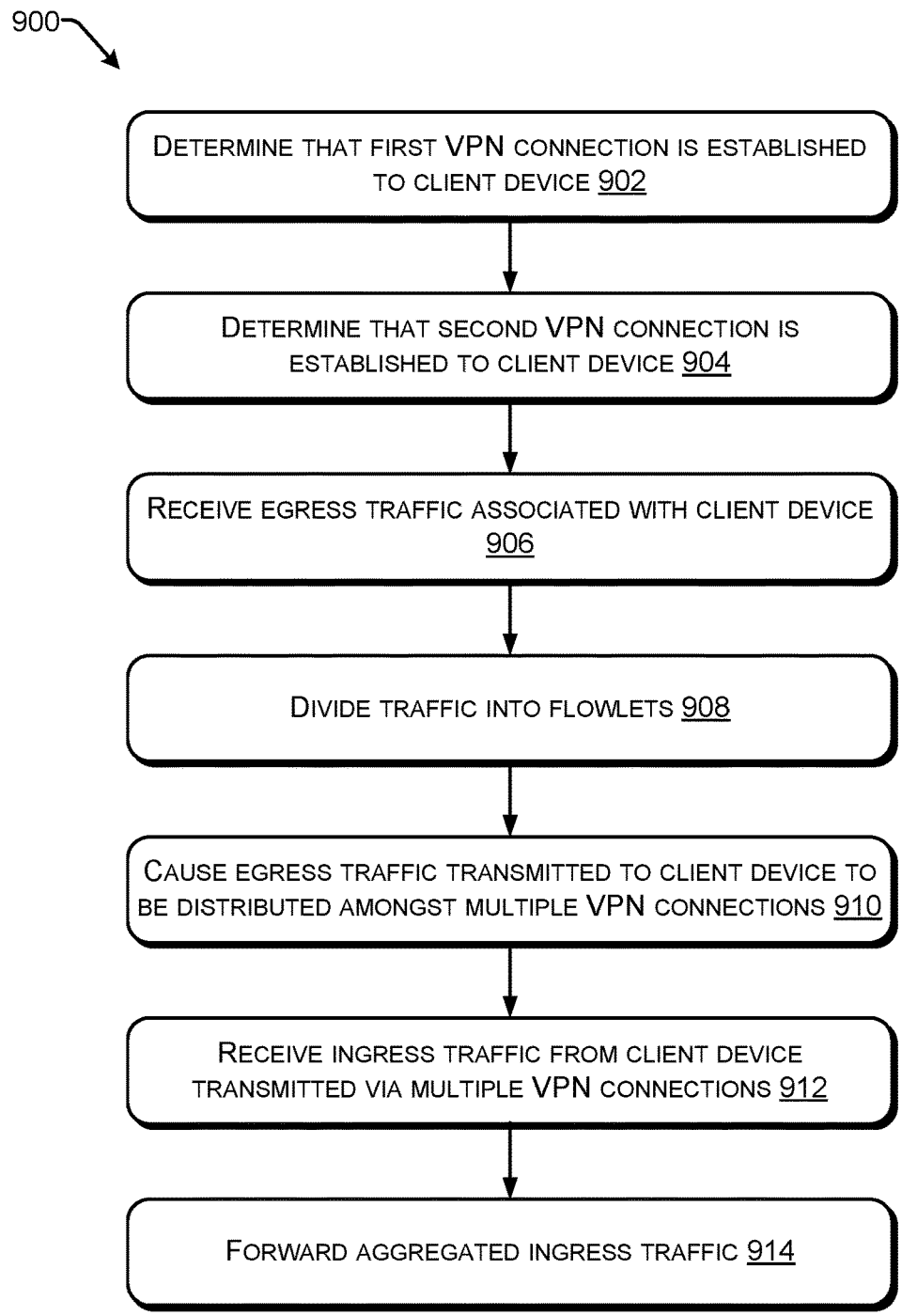
FIG. 9 illustrates a flow chart depicting an example process for a VPN aggregation component associated with an application server aggregating multiple VPNs.

FIGS. 7-9 depict flow diagrams that show example processes in accordance with various examples. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the processes. Processes according to various examples of the present disclosure may include only some or all of the operations depicted in the logical flow graphs.

FIG. 7 illustrates a flow chart depicting an example process 700 for a client device distributing traffic amongst multiple VPN connections. At 702, a client device, such as the client device 102 or the router client device 202, establishes a first VPN connection over a first network interface device that interfaces with a first access network. The first VPN connection is established with a first VPN server, such as the VPN server 110 or the VPN server 114. The first VPN connection may be established with one or more of tunneling, encryption, authentication, and establishment of the first VPN connection may include any of encryption keys, authentication credentials, and so forth.

At 704, the client device determines whether to establish a second VPN connection. The client device may determine to establish the second VPN connection based on a policy in a policy store that indicates that application traffic is to be provided with additional security. In some embodiments, the second VPN connection may be established by the client device upon a determination that a second network interface card and/or a second access network connection are available. The client device may determine to establish the second VPN connection based on the second access network having sufficient signal strength, throughput, delay times, etc.

At 706 (following the "YES" arrow), the client device establishes the second VPN connection. The client device establishes the second VPN connection over a second network interface device that interfaces with a second access network. The second VPN connection is established with a second VPN server, such as the VPN server 110 or the VPN server 114. The second VPN connection may be established with one or more of tunneling, encryption, authentication, and establishment of the second VPN connection may include any of encryption keys, authentication credentials, and so forth. Steps 704 and 706 may repeat for additional VPN connections. Once a new VPN connection is created, a status of the new VPN connection may be monitored. Upon determining that the status of the new VPN connection indicates that the new VPN connection meets or exceeds one or more performance thresholds, the new VPN connection may be added to a list of currently existing VPN connections, and as a result the application traffic may be caused to be distributed amongst the currently existing VPN connections, including the new VPN connection. Similarly, upon detecting that a VPN connection is no longer available, it may be removed from the list of currently existing VPN connections, and traffic is not distributed to it. Thus, where the client device detects a new access network, the client device may establish a connection to the access network and establish a VPN connection over the new access network. Where an existing current VPN connection exists, and remains active after establishment of the new VPN connection, the new and existing VPN connections may be aggregated to distribute application traffic amongst them as described herein.

At 708, a VPN aggregation component on the client device (such as VPN aggregation component 310) receives egress application traffic associated with an application connection between an application server and a client application. The client application may execute on the client device, or another device (such as the devices 204). The application connection may include a traffic flow defined by one or more of a 5-tuple of destination address, source address, protocol, source port, and destination port. The application connection may include a traffic flow defined by upper-layer protocol flows. The application connection may include both ingress traffic (from the client application to the application server) and egress traffic (from the application server to the client application).

At 710, the VPN aggregation component of the client device breaks up the traffic into flowlets. Flowlets may include one or more packets from a single application connection or flow. A flowlet may be determined based on a data burst, e.g., based on determining that a threshold period of time has elapsed since the last egress traffic burst was transmitted, although a flowlet may not be determined or defined this way. Flowlets could be determined by one or more continuous packets.

At 712, the VPN aggregation component of the client device causes the flowlets to be distributed over multiple VPN connections, such as the first VPN connection and the second VPN connection. The distribution of flowlets over the multiple VPN connection may be determined based on load balancing over the multiple VPN connections. The distribution of flowlets over the multiple VPN connections may be determined based on a scheme to reduce the out-of-order arrival of packets at the receiver. The distribution of flowlets over the multiple VPN connection may be determined based on a balance between security and performance. In some embodiments, ingress traffic is received across one VPN connection, and egress traffic is transmitted across another VPN connection. Other schemes for distributing the egress flowlets over multiple VPN connections is possible without departing from the scope of embodiments. The VPN aggregation component can detect the activation or de-activation of a virtual or hardware network interface (such as access network interface hardware 314 or 316). If a new active network interface is detected, steps 704 and 706 may repeat and new VPN connections may be created.

At 714, the VPN aggregation component of the client device receives ingress traffic from multiple VPN connections. The ingress traffic is associated with the connection between the client application and the application server. At 716, the VPN aggregation component of the client device aggregates the traffic and provides the traffic to the client application (executing either on the client device or on another device, such as one of the devices 204). The VPN aggregation component may re-order the packets before providing them to the client application, although the VPN aggregation component does not reorder the packets in some embodiments. The VPN aggregation component may obtain the packets in an order that is determined according to a predetermined connection hopping pattern. Thus, the packets may arrive without data indicating a packet order, and instead the order determined based on the connection hopping pattern. In this case, the VPN aggregation component orders the packets according to the order that is determined according to a predetermined connection hopping pattern.

FIG. 8 illustrates a flow chart depicting an example process 800 for monitoring and adjusting distribution of traffic over multiple aggregated VPN connections. At 802, the client device and/or the VPN aggregation component associated with the application server monitors the availability and one or more performance aspects of the VPN connections, including monitoring or detecting the activation or de-activation of the VPN connections. The performance aspects include, in some examples, round trip delay times of the VPN connections, measured throughput of the VPN connections, jitter of the VPN connections, packet loss of the VPN connections, and so forth.

At 804, the client device and/or the VPN aggregation component associated with the application server determine a metric that indicates a degree to which the packets arrive out of order. For example, the metric may be a percentage, rate, or other number of packets that arrive out of order. The metric may be a magnitude of displacement, such as a number of places that an average out-of-order packet arrives (e.g., that the average out-of-order packet arrives five packets later than it should have in the order), and so forth.

At 806, the client device and/or the VPN aggregation component associated with the application server signals to the transmitting node to adjust its transmission in order to reduce the number or displacement magnitude of out-of-order packets. The signal may be transmitted over one of the VPN connections, such as in a control transmission packet or other data packet over a control connection between the VPN aggregation component on the client device and the VPN aggregation component associated with the application server.

At 808, the client device and/or the VPN aggregation component associated with the application server adjust distribution of the packets over the multiple VPN connections. The adjustment of distribution may be based on the signals received from the receiver to adjust transmission to reduce out-of-order packets. The transmitter may adjust a ratio of packets transmitted across each of the multiple VPN connections to reduce out-of-order packets. The transmitter may adjust the cadence—the times of transmission—of packets over the multiple VPN connections based on the signal and/or measured round-trip delay times of the multiple VPN connections in order to reduce the number of magnitude of out-of-order packets. The adjustment may be based on measured throughput of the multiple VNO connections, and ratios of packets transmitted down each VPN connection may be altered in order to adjust the load balancing, to increase overall throughput, to reduce out-of-order packets, to reduce jitter, and so forth. The process may repeat as long as there are VPN connections established, as indicated by the arrow from 808 back to 802.

FIG. 9 illustrates a flow chart depicting an example process 900 for a VPN aggregation component associated with an application server aggregating multiple VPNs. At 902, the VPN aggregation component, such as the VPN aggregation component 118, determines that a client device, such as the client device 102 or the router client device 202, has established a first VPN connection via at least a first network interface device of the client device that interfaces with a first access network. The VPN aggregation component may determine this based on communications from the VPN server, communication from the client device, or based on other information.

At 904, the VPN aggregation component determines that the client device has established a second VPN connection via at least a second network interface device of the client device that interfaces with a second access network, the first access network and the second access network being different networks. Step 904 may repeat for additional VPN connections.

At 906, the VPN aggregation component receives egress application traffic associated with a connection between an application server and a client application executing on the client device. The egress traffic is traffic that originates with the application server with destination of the client device. The application connection may include a traffic flow defined by one or more of a 5-tuple of destination address, source address, protocol, source port, and destination port. The application connection may include a traffic flow defined by upper-layer protocol flows. The application connection may include both ingress traffic (from the client application to the application server) and egress traffic (from the application server to the client application).

At 908, the VPN aggregation component breaks up the egress traffic into flowlets. Flowlets may include one or more packets from a single application connection or flow. A flowlet may be determined based on a data burst, e.g., based on determining that a threshold period of time has elapsed since the last egress traffic burst was transmitted, although a flowlet may not be determined or defined this way. Flowlets could be determined by one or more continuous packets.

At 910, the VPN aggregation component causes the egress application traffic associated with the connection between the application server and the client application to be distributed between at least the first VPN connection and the second VPN connection. The distribution of flowlets over the multiple VPN connections may be determined based on load balancing over the multiple VPN connections. The distribution of flowlets over the multiple VPN connection may be determined based on a scheme to reduce the out-of-order arrival of packets at the receiver. The distribution of flowlets over the multiple VPN connection may be determined based on a balance between security and performance. In some embodiments, ingress traffic is received across one VPN connection, and egress traffic is transmitted across another VPN connection. Other schemes for distributing the egress flowlets over multiple VPN connections is possible without departing from the scope of embodiments.

At 912, the VPN aggregation component of the client device receives ingress traffic (traffic from the client device addressed to the application server) from multiple VPN connections. The ingress traffic is associated with the connection between the client application and the application server. At 914, the VPN aggregation component aggregates the traffic and forwards the traffic to the application server. The VPN aggregation component may re-order the packets before providing them to the application server, although the VPN aggregation component does not reorder the packets in some embodiments. The VPN aggregation component may obtain the packets in an order that is determined according to a predetermined connection hopping pattern. Thus, the packets may arrive without data indicating a packet order, and instead the order determined based on the connection hopping pattern. In this case, the VPN aggregation component orders the packets according to the order that is determined according to a predetermined connection hopping pattern.

According to various non-limiting examples, the computing systems described herein (such as the client devices 102, 202, 300, 400, as well as the server computing system 500, and the host server nodes 604, 606, and 610), includes one or more devices, such as servers, storage devices, tablet computers, laptops, desktop computers, gaming consoles, media players, mobile phones, handheld computers, wearable devices, smart appliances, networking equipment, kiosk devices, and so forth. In one example configuration, the computing systems comprise at least one processor. The computing systems also contain communication connection(s) that allow communications with various other systems. The computing systems also include one or more input devices, such as a keyboard, mouse, pen, voice input device, touch input device, etc., and one or more output devices, such as a display (including a touch-screen display), speakers, printer, etc. coupled communicatively to the processor(s) and computer-readable media via connections such as a bus.

The memory 304, 404, 504, 618, 622, and 626 are examples of computer-readable media. Computer-readable media stores computer-executable instructions that are loadable and executable by one or more processor(s), as well as data generated during execution of, and/or usable in conjunction with, these programs. In the illustrated example, computer-readable media stores operating system instances, which provide basic system functionality to applications 306 and 308, the client-side VPN aggregation components 310 and 408, the VPN aggregation component 118, policy stores 312, 410, and 514, the VPN clients 318, 320, 416, and 418, VPN servers 110 and 114, application server(s) 116, protocol stacks 322, 324, 420, 422, 506, and 508. One or more of these components, including the operating systems, may be instantiated as virtual machines, application containers, or as some other type of virtualized instantiation.

Processor(s) 302, 402, 502, 616, 620, and 624 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media (e.g., memory 304, 404, 504, 618, 622, and 626) include volatile memory (such as random access memory (RAM)) and/or non-volatile memory (such as read-only memory (ROM), flash memory, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Various processes described herein are carried out as computing functions in conjunction with networking functions. For example, one computing device or system may cause transmission of a message to another computing device via network interface hardware. This may include, for example, passing by a software module a pointer, argument, or other data to a networking module. The pointer, argument or other data may identify data stored in memory or in a register that is to be transmitted to another computing device. The networking module may include a protocol stack, and may read the data identified by the pointer, argument, or other data. The protocol stack may encapsulate the data in one or more frames, packets, cells, or other data networking protocol structures. The protocol stack may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver. A processor of the destination computing device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module receives an execution thread along with the argument, pointer, or other data, and reads the data from the identified location.

EXAMPLE CLAUSES

Clause A. A computing device, comprising one or more processors, memory and a plurality of programming instructions stored on the memory and executable by the one or more processors to perform acts. The acts include establishing a first Virtual Private Network (VPN) connection over a first network interface that connects to a first VPN server, establishing a second VPN connection over a second network interface that connects to a second VPN server, receiving application traffic associated with a connection between an application server and a client application, and causing the application traffic to be distributed between at least the first VPN connection and the second VPN connection.

Clause B. The computing device of clause A, wherein the first network interface and the second network interface are on a same network.

Clause C. The computing device of either clause A or B, wherein the first VPN server and the second VPN server are hosted on a same computing system.

Clause D. The computing device of any of clauses A-C, wherein the multiple VPN connections use different tunneling protocols, different encryption standards, and different authentication credentials, wherein the first VPN connection is established with a first tunneling protocol, a first encryption standard, and first authentication credentials, and the second VPN connection is established with a second tunneling protocol, a second encryption standard, and second authentication credentials. At least one of the first tunneling protocol is different than the second tunneling protocol, the first encryption standard and the second encryption standard are different, or the first authentication credentials and the second authentication credentials are different.

Clause E. The computing device any of clauses A-D, wherein the acts further include detecting that a new VPN connection is created, monitoring a status of the new VPN connection, upon determining that the status of the new VPN connection indicates that the new VPN connection meets or exceeds one or more performance thresholds, adding the new VPN connection to currently existing VPN connections, and causing the application traffic to be distributed between the currently existing VPN connections including the new VPN connection.

Clause F. The computing device of any of clauses A-E, wherein the application traffic includes a first group of data packets and a second group of data packets, and the acts further include detecting a threshold period of transmission inactivity between transmission of the first group of data packets over the first VPN connection and receipt of the second group of data packets from the client application, and causing the application traffic to be distributed between the first VPN connection and the second VPN connection by at least transmitting the second group of data packets over the second VPN connection based on the threshold period of transmission inactivity.

Clause G. The computing device of any of clauses A-F, wherein the acts further include causing transmission of the application traffic between at least the first VPN connection and the second VPN connection based at least on a connection hopping pattern.

Clause H. The computing device of any of clauses A-G, wherein the acts further comprise monitoring throughput of the first VPN connection and the second VPN connection, and causing the application traffic to be distributed between the first VPN connection and the second VPN connection based at least on a ratio of the throughput of the first VPN connection and the second VPN connection.

Clause I. The computing device of any of clauses A-H, wherein the acts further include determining a first delay associated with the first VPN connection, determining a second delay associated with the second VPN connection, and causing the application traffic to be distributed between the first VPN connection and the second VPN connection based at least on the first delay associated with the first VPN connection and the second delay associated with the second VPN connection.

Clause J. The computing device of any of clauses A-I, wherein the application traffic comprises incoming packets and outgoing packets, and wherein causing the application traffic to be distributed between at least the first VPN connection and the second VPN connection includes causing the outgoing packets to utilize the first VPN connection and causing the incoming packets to utilize the second VPN connection.

Clause K. The computing device of any of clauses A-J, wherein the acts further include determining that first data packets of the application traffic received via the first VPN connection are received out-of-order with respect to second data packets received via the second VPN connection, and in response to determining, signaling to an aggregation component associated with the application server to adjust a ratio of data packets transmitted via the first VPN connection and the second VPN connection.

Clause L. A computing system, comprising one or more processors, memory, and a plurality of programming instructions stored on the memory and executable by the one or more processors to determine that a client device has established a first VPN connection via a first network interface with a first VPN server, determine that the client device has established a second VPN connection via a second network interface device with a second VPN server, receive application traffic associated with a connection between an application server and a client application executing on the client device, and cause the application traffic to be distributed between the first VPN connection and the second VPN connection.

Clause M. The computing system of clause L, wherein the plurality of programming instructions are further executable by the one or more processors to implement the first VPN server configured to establish the first VPN connection with the client device.

Clause N. The computing system of either clause L or M, wherein the second VPN server is hosted on a host node, and wherein the plurality of programming instructions are further executable by the one or more processors to communicate with the host node via a network.

Clause O. The computing system of any of clauses L-N, wherein the plurality of programming instructions are further executable by the one or more processors to receive first one or more data packets of the application traffic transmitted by the client device over the first VPN connection, receive second one or more data packets of the application traffic transmitted by the client device over the second VPN connection, aggregate the first one or more data packets and the second one or more data packets into a combined data flow, and transmit the combined data flow to the application server.

Clause P. The computing system of any of clauses L-O, wherein the plurality of programming instructions are further executable by the one or more processors to receive, at a first time, a first data packet of the application traffic associated with the connection, the first data packet transmitted by the client device via the first VPN connection, receive, at a second time a second data packet of the application traffic associated with the connection transmitted by the client device via the second VPN connection, determine, from the first time and the second time, and from a first sequence number of the first data packet and a second sequence number of the second data packet, that the first data packet and the second data packet were received out of order, and based at least on determining that the first data packet and the second data packet arrived out of order, cause a signal to be transmitted to the client device, the signal indicating to adjust a ratio of packets transmitted to the client device via the first VPN connection or the second VPN connection.

Clause Q. The computing system of any of clauses L-P, wherein the plurality of programming instructions are further executable by the one or more processors to cause transmission of data packets associated with the application traffic on the first VPN connection and the second VPN connection based at least on a connection hopping pattern.

Clause R. A method comprising establishing by a first VPN server a first Virtual Private Network (VPN) connection to a client device via a first access network of the client device, establishing by a second VPN server a second Virtual Private Network (VPN) connection to the client device via a second access network of the client device, receiving application traffic associated with a connection between an application server and a client application that corresponds to the client device, and causing the application traffic to be distributed between the first VPN connection and the second VPN connection.

Clause S. The method of clause R, wherein the first VPN connection is established with a first tunneling protocol, a first encryption standard, and first authentication credentials, the second VPN connection is established with a second tunneling protocol, a second encryption standard, and second authentication credentials, and wherein at least one of the first tunneling protocol is different than the second tunneling protocol, the first encryption standard is different than the second encryption standard, or the first authentication credentials is different than the second authentication credentials.

Clause T. The method of either clause R or S, further comprising receiving first one or more data packets of the application traffic transmitted by the client device over the first VPN connection, receiving second one or more data packets of the application traffic transmitted by the client device over the second VPN connection, aggregating the first one or more data packets and the second one or more data packets into a combined data flow, and transmitting the combined data flow to the application server.

Clause U. The method of any of clauses R-T, further comprising determining that the first one or more data packets of the application traffic received from the client device via the first VPN connection are received out-of-order with respect to the second one or more data packets received from the client device via the second VPN connection, and signaling to the client device, based on determining that the first one or more packets are received out of order with respect to the second one or more data packets, to adjust a ratio of data packets transmitted via the first VPN connection and the second VPN connection.

Clause V. A computing device, comprising means for establishing a first Virtual Private Network (VPN) connection over a first network interface that connects to a first VPN server, means for establishing a second VPN connection over a second network interface that connects to a second VPN server, means for receiving application traffic associated with a connection between an application server and a client application, and means for causing the application traffic to be distributed between at least the first VPN connection and the second VPN connection.

Clause W. The computing device of clause V, wherein the first network interface and the second network interface are on a same network.

Clause X. The computing device of either clause V or W, wherein the first VPN server and the second VPN server are hosted on a same computing system.

Clause Y. The computing device of any of clauses V-X, wherein the multiple VPN connections use different tunneling protocols, different encryption standards, and different authentication credentials, wherein the first VPN connection is established with a first tunneling protocol, a first encryption standard, and first authentication credentials, and the second VPN connection is established with a second tunneling protocol, a second encryption standard, and second authentication credentials. At least one of the first tunneling protocol is different than the second tunneling protocol, the first encryption standard and the second encryption standard are different, or the first authentication credentials and the second authentication credentials are different.

Clause Z. The computing device any of clauses V-Y, further comprising means for detecting that a new VPN connection is created, means for monitoring a status of the new VPN connection, upon determining that the status of the new VPN connection indicates that the new VPN connection meets or exceeds one or more performance thresholds, means for adding the new VPN connection to currently existing VPN connections, and means for causing the application traffic to be distributed between the currently existing VPN connections including the new VPN connection.

Clause AA. The computing device of any of clauses V-Z, wherein the application traffic includes a first group of data packets and a second group of data packets, and the computing device further comprises means for detecting a threshold period of transmission inactivity between transmission of the first group of data packets over the first VPN connection and receipt of the second group of data packets from the client application, and means for causing the application traffic to be distributed between the first VPN connection and the second VPN connection by at least transmitting the second group of data packets over the second VPN connection based on the threshold period of transmission inactivity.

Clause AB. The computing device of any of clauses V-AA, further comprising means for causing transmission of the application traffic between at least the first VPN connection and the second VPN connection based at least on a connection hopping pattern.

Clause AC. The computing device of any of clauses V-AB, further comprising means for monitoring throughput of the first VPN connection and the second VPN connection, and means for causing the application traffic to be distributed between the first VPN connection and the second VPN connection based at least on a ratio of the throughput of the first VPN connection and the second VPN connection.

Clause AD. The computing device of any of clauses V-AC, further comprising means for determining a first delay associated with the first VPN connection, means for determining a second delay associated with the second VPN connection, and means for causing the application traffic to be distributed between the first VPN connection and the second VPN connection based at least on the first delay associated with the first VPN connection and the second delay associated with the second VPN connection.

Clause AE. The computing device of any of clauses V-AD, wherein the application traffic comprises incoming packets and outgoing packets, and wherein means for causing the application traffic to be distributed between at least the first VPN connection and the second VPN connection includes means for causing the outgoing packets to utilize the first VPN connection and means for causing the incoming packets to utilize the second VPN connection.

Clause AF. The computing device of any of clauses V-AE, further comprising means for determining that first data packets of the application traffic received via the first VPN connection are received out-of-order with respect to second data packets received via the second VPN connection, and in response to determining, means for signaling to an aggregation component associated with the application server to adjust a ratio of data packets transmitted via the first VPN connection and the second VPN connection.

Clause AG. A computing system, comprising means for determining that a client device has established a first VPN connection via a first network interface with a first VPN server, means for determining that the client device has established a second VPN connection via a second network interface device with a second VPN server, means for receiving application traffic associated with a connection between an application server and a client application executing on the client device, and means for causing the application traffic to be distributed between the first VPN connection and the second VPN connection.

Clause AH. The computing system of clause AG, further comprising means for implementing the first VPN server configured to establish the first VPN connection with the client device.

Clause AI. The computing system of either clause AG or AH, wherein the second VPN server is hosted on a host node, and wherein the computing device further comprises means for communicating with the host node via a network.

Clause AJ. The computing system of any of clauses AG-AI, further comprising means for receiving first one or more data packets of the application traffic transmitted by the client device over the first VPN connection, means for receiving second one or more data packets of the application traffic transmitted by the client device over the second VPN connection, means for aggregating the first one or more data packets and the second one or more data packets into a combined data flow, and means for transmitting the combined data flow to the application server.

Clause AK. The computing system of any of clauses AG-AJ, further comprising means for receiving, at a first time, a first data packet of the application traffic associated with the connection, the first data packet transmitted by the client device via the first VPN connection, means for receiving, at a second time a second data packet of the application traffic associated with the connection transmitted by the client device via the second VPN connection, means for determining, from the first time and the second time, and from a first sequence number of the first data packet and a second sequence number of the second data packet, that the first data packet and the second data packet were received out of order, and based at least on determining that the first data packet and the second data packet arrived out of order, means for causing a signal to be transmitted to the client device, the signal indicating to adjust a ratio of packets transmitted to the client device via the first VPN connection or the second VPN connection.

Clause AL. The computing system of any of clauses AG-AK, further comprising means for causing transmission of data packets associated with the application traffic on the first VPN connection and the second VPN connection based at least on a connection hopping pattern.

Clause AM. A method comprising establishing a first Virtual Private Network (VPN) connection over a first network interface that connects to a first VPN server, establishing a second VPN connection over a second network interface that connects to a second VPN server, receiving application traffic associated with a connection between an application server and a client application, and causing the application traffic to be distributed between at least the first VPN connection and the second VPN connection.

Clause AN. The method of clause AM, wherein the first network interface and the second network interface are on a same network.

Clause AO. The method of either clause AM or AN, wherein the first VPN server and the second VPN server are hosted on a same computing system.

Clause AP. The method of any of clauses AM-AO, wherein the multiple VPN connections use different tunneling protocols, different encryption standards, and different authentication credentials, wherein the first VPN connection is established with a first tunneling protocol, a first encryption standard, and first authentication credentials, and the second VPN connection is established with a second tunneling protocol, a second encryption standard, and second authentication credentials. At least one of the first tunneling protocol is different than the second tunneling protocol, the first encryption standard and the second encryption standard are different, or the first authentication credentials and the second authentication credentials are different.

Clause AQ. The method any of clauses AM-AP, further comprising detecting that a new VPN connection is created, monitoring a status of the new VPN connection, upon determining that the status of the new VPN connection indicates that the new VPN connection meets or exceeds one or more performance thresholds, adding the new VPN connection to currently existing VPN connections, and causing the application traffic to be distributed between the currently existing VPN connections including the new VPN connection.

Clause AR. The method of any of clauses AM-AQ, wherein the application traffic includes a first group of data packets and a second group of data packets, and the method further comprises detecting a threshold period of transmission inactivity between transmission of the first group of data packets over the first VPN connection and receipt of the second group of data packets from the client application, and causing the application traffic to be distributed between the first VPN connection and the second VPN connection by at least transmitting the second group of data packets over the second VPN connection based on the threshold period of transmission inactivity.

Clause AS. The computing device of any of clauses AM-AR, further comprising causing transmission of the application traffic between at least the first VPN connection and the second VPN connection based at least on a connection hopping pattern.

Clause AT. The method of any of clauses AM-AS, further comprising monitoring throughput of the first VPN connection and the second VPN connection, and causing the application traffic to be distributed between the first VPN connection and the second VPN connection based at least on a ratio of the throughput of the first VPN connection and the second VPN connection.

Clause AU. The method of any of clauses AM-AT, further comprising determining a first delay associated with the first VPN connection, determining a second delay associated with the second VPN connection, and causing the application traffic to be distributed between the first VPN connection and the second VPN connection based at least on the first delay associated with the first VPN connection and the second delay associated with the second VPN connection.

Clause AV. The method of any of clauses AM-AT, wherein the application traffic comprises incoming packets and outgoing packets, and wherein causing the application traffic to be distributed between at least the first VPN connection and the second VPN connection includes causing the outgoing packets to utilize the first VPN connection and means for causing the incoming packets to utilize the second VPN connection.

Clause AW. The computing device of any of clauses AM-AV, further comprising determining that first data packets of the application traffic received via the first VPN connection are received out-of-order with respect to second data packets received via the second VPN connection, and in response to determining, signaling to an aggregation component associated with the application server to adjust a ratio of data packets transmitted via the first VPN connection and the second VPN connection.

CONCLUSION

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are within the scope of this disclosure and protected by the following claims.

What is claimed is:

1. A method, implemented at a computer system including one or more processors, for utilizing multiple concurrent Virtual Private Networks associated with a computing device, the method comprising:
   determining, at an aggregation computer system, that a client device has established a first Virtual Private Network (VPN) connection over a first network interface that connects to a first VPN server, the first VPN server including a corresponding first VPN address;
   determining, at the aggregation computer system, that the client device has established a second VPN connection over a second network interface that connects to a second VPN server, the second VPN server including a corresponding second VPN address that is different than the first VPN address;
   receiving, at the aggregation computer system, application traffic associated with a connection between an application server and a client application from both the first VPN server and the second VPN server, such that a first subset of the application traffic is received from the first VPN server and a second subset of the application traffic that is different than the first subset is received from the second VPN server, the application traffic received from both the first VPN server and the second VPN server being destined for the application server;
   aggregating, at the aggregation computer system, the first subset of the application traffic received from the first VPN server and the second subset of the application traffic received from the second VPN server prior to transmitting the received application traffic to the application server; and
   transmitting the aggregated application traffic from the aggregation computer system to the application server.

2. The method of claim 1, wherein the first network interface and the second network interface are on different networks.

3. The method of claim 2, wherein the first VPN server and the second VPN server are hosted on different computing systems.

4. The method of claim 1, wherein the multiple VPN connections use different tunneling protocols, different encryption standards, and different authentication credentials, wherein the first VPN connection is established with a first tunneling protocol, a first encryption standard, and first authentication credentials, and the second VPN connection is established with a second tunneling protocol, a second encryption standard, and second authentication credentials, and wherein at least one of:
   the first tunneling protocol is different than the second tunneling protocol;
   the first encryption standard and the second encryption standard are different; or
   the first authentication credentials and the second authentication credentials are different.

5. The method of claim 1, further comprising:
   detecting that a new VPN connection is created;
   monitoring a status of the new VPN connection;
   upon determining that the status of the new VPN connection indicates that the new VPN connection meets or exceeds one or more performance thresholds, adding the new VPN connection to currently existing VPN connections; and
   causing the application traffic to be distributed between the currently existing VPN connections including the new VPN connection.

6. The method of claim 1, wherein the application traffic includes a first group of data packets and a second group of data packets, the method further comprising:
   detecting a threshold period of transmission inactivity between transmission of the first group of data packets over the first VPN connection and receipt of the second group of data packets from the client application; and
   causing the application traffic to be distributed between the first VPN connection and the second VPN connection by at least transmitting the second group of data packets over the second VPN connection based on the threshold period of transmission inactivity.

7. The method of claim 1, wherein transmission of the application traffic between at least the first VPN connection and the second VPN connection is based at least on a connection hopping pattern.

8. The method of claim 1, further comprising:
   monitoring throughput of the first VPN connection and the second VPN connection; and
   causing the application traffic to be distributed between the first VPN connection and the second VPN connection based at least on a ratio of the throughput of the first VPN connection and the second VPN connection.

9. The method of claim 1, further comprising:
   determining a first delay associated with the first VPN connection;
   determining a second delay associated with the second VPN connection; and
   causing the application traffic to be distributed between the first VPN connection and the second VPN connection based at least on the first delay associated with the first VPN connection and the second delay associated with the second VPN connection.

10. The method of claim 1, wherein the application traffic comprises incoming packets and outgoing packets, and wherein causing the application traffic to be distributed between at least the first VPN connection and the second VPN connection includes causing the outgoing packets to utilize the first VPN connection and causing the incoming packets to utilize the second VPN connection.

11. The method of claim 1, further comprising:
   determining that first data packets of the application traffic received via the first VPN connection are received out-of-order with respect to second data packets received via the second VPN connection; and in response to determining, signaling to the aggregation computer system to adjust a ratio of data packets transmitted via the first VPN connection and the second VPN connection.

12. A computing system, comprising:
one or more processors; and
one or more computer-readable media having stored thereon computer-executable instructions that are executable by the one or more processors to utilize multiple concurrent Virtual Private Networks associated with a computing device, the computer-executable instructions including instructions that are executable to cause the computing system to perform at least the following:
   determine, at an aggregation computer system, that a client device has established a first Virtual Private Network (VPN) connection via a first network interface that connects to a first VPN server, the first VPN server including a corresponding first VPN address;
   determine, at the aggregation computer system, that the client device has established a second VPN connection via a second network interface device that connects to a second VPN server, the second VPN server including a corresponding second VPN address that is different than the first VPN address;
   receive, at the aggregation computer system, application traffic associated with a connection between an application server and a client application executing on the client device from both the first VPN server and the second VPN server, such that a first subset of the application traffic is received from the first VPN server and a second subset of the application traffic that is different than the first subset is received from the second VPN server, the application traffic received from both the first VPN server and the second VPN server being destined for the application server;
   aggregate, at the aggregation computer system, the first subset of the application traffic received from the first VPN server and the second subset of the application traffic received from the second VPN server prior to transmitting the received application traffic to the application server; and
   transmit the aggregated application traffic from the aggregation computer system to the application server.

13. The computing system of claim 12, wherein the computer-executable instructions further include instructions that are executable to cause the computer system to implement the first VPN server configured to establish the first VPN connection with the client device.

14. The computing system of claim 13, wherein the second VPN server is hosted on a host node, and wherein the plurality of programming instructions are further executable by the one or more processors to communicate with the host node via a network.

15. The computing system of claim 12, wherein the computer-executable instructions further include instructions that are executable to cause the computer system to:
   receive, from the application server, application traffic associated with the connection between the application server and the client application; and
   cause the application traffic to be distributed between the first VPN connection and the second VPN connection.

16. The computing system of claim 12, wherein the computer-executable instructions further include instructions that are executable to cause the computer system to:
   receive, at a first time, a first data packet of the application traffic associated with the connection, the first data packet transmitted by the client device via the first VPN connection;
   receive, at a second time a second data packet of the application traffic associated with the connection transmitted by the client device via the second VPN connection;
   determine, from the first time and the second time, and from a first sequence number of the first data packet and a second sequence number of the second data packet, that the first data packet and the second data packet were received out of order; and
   based at least on determining that the first data packet and the second data packet arrived out of order, cause a signal to be transmitted to the client device, the signal indicating to adjust a ratio of packets transmitted to the client device via the first VPN connection or the second VPN connection.

17. The computing system of claim 12, wherein the computer-executable instructions further include instructions that are executable to cause the computer system to cause transmission of data packets associated with the application traffic on the first VPN connection and the second VPN connection based at least on a connection hopping pattern.

18. A computer program product comprising one or more hardware storage devices having stored thereon computer-executable instructions that are executable by one or more processors of a computer system to utilize multiple concurrent Virtual Private Networks associated with a computing device, the computer-executable instructions including instructions that are executable to cause the computer system to perform at least the following:
   determine, at an aggregation computer system, that a client device has established a first Virtual Private Network (VPN) connection over a first network interface that connects to a first VPN server, the first VPN server including a corresponding first VPN address;
   determine, at the aggregation computer system, that the client device has established a second VPN connection over a second network interface that connects to a second VPN server, the second VPN server including a corresponding second VPN address that is different than the first VPN address;
   receive, at the aggregation computer system application traffic associated with a connection between an application server and a client application that corresponds to the client device from both the first VPN server and the second VPN server, such that a first subset of the application traffic is received from the first VPN server and a second subset of the application traffic that is different than the first subset is received from the second VPN server, the application traffic received from both the first VPN server and the second VPN server being destined for the application server;
   aggregate, at the aggregation computer system, the first subset of the application traffic received from the first VPN server and the second subset of the application traffic received from the second VPN server prior to transmitting the received application traffic to the application server; and
   transmit the aggregated application traffic from the aggregation computer system to the application server.

19. The computer program product of claim 18, wherein the first VPN connection is established with a first tunneling protocol, a first encryption standard, and first authentication credentials, the second VPN connection is established with a second tunneling protocol, a second encryption standard, and second authentication credentials, and wherein at least one of:

the first tunneling protocol is different than the second tunneling protocol;

the first encryption standard is different than the second encryption standard; or the first authentication credentials is different than the second authentication credentials.

20. The computer program product of claim 18, wherein the computer-executable instructions further include instructions that are executable to cause the computer system to:

receive, from the application server, application traffic associated with the connection between the application server and the client application; and cause the application traffic to be distributed between the first VPN connection and the second VPN connection.

21. The computer program product of claim 18, wherein the computer-executable instructions further include instructions that are executable to cause the computer system to:

determine that first one or more data packets of the application traffic received from the client device via the first VPN connection are received out-of-order with respect to second one or more data packets received from the client device via the second VPN connection; and signal to the client device, based on determining that the first one or more packets are received out of order with respect to the second one or more data packets, to adjust a ratio of data packets transmitted via the first VPN connection and the second VPN connection.

\* \* \* \* \*